United States Patent
Melcher

(10) Patent No.: US 10,598,292 B2
(45) Date of Patent: Mar. 24, 2020

(54) HYDRAULIC BYPASS SYSTEM

(71) Applicant: Thomas W. Melcher, Mesa, AZ (US)

(72) Inventor: Thomas W. Melcher, Mesa, AZ (US)

( * ) Notice: Subject to any disclaimer, the term of this patent is extended or adjusted under 35 U.S.C. 154(b) by 113 days.

(21) Appl. No.: 15/585,064

(22) Filed: May 2, 2017

(65) Prior Publication Data

US 2017/0321729 A1 Nov. 9, 2017

Related U.S. Application Data

(60) Provisional application No. 62/332,893, filed on May 6, 2016.

(51) Int. Cl.
*B60G 21/073* (2006.01)
*F16K 15/04* (2006.01)
*B62M 27/02* (2006.01)

(52) U.S. Cl.
CPC .......... *F16K 15/044* (2013.01); *B60G 21/073* (2013.01); *B60G 2300/322* (2013.01); *B60G 2300/45* (2013.01); *B60G 2800/012* (2013.01); *B60Y 2200/252* (2013.01); *B60Y 2400/86* (2013.01); *B62M 2027/026* (2013.01)

(58) Field of Classification Search
CPC ............. B60G 21/073; B60G 2300/45; B60G 2300/322; B60G 2800/012; B62M 2027/026; B60Y 2200/252; B60Y 2400/86
USPC ... 280/6.15, 124.103, 124.106, 5.509, 5.506, 280/124.16, 124.161, 124.157
See application file for complete search history.

(56) References Cited

U.S. PATENT DOCUMENTS

| | | | |
|---|---|---|---|
| 2,152,938 A | 4/1939 | Welch | |
| 2,206,970 A | 7/1940 | Megow | |
| 2,791,919 A | 5/1957 | Wildhaber | |
| 2,907,578 A | 10/1959 | Taber | |
| 3,567,243 A | 3/1971 | Ruhlin | |
| 3,652,104 A | 3/1972 | Chabek | |
| 3,711,113 A | 1/1973 | Stammreich | |
| 3,751,061 A | 8/1973 | Scheuerpflug | |
| 3,765,498 A | 10/1973 | Rogerson | |
| 3,863,727 A | 2/1975 | Michrina | |
| 3,912,293 A * | 10/1975 | Harbers | B60G 17/052 180/24.02 |

(Continued)

FOREIGN PATENT DOCUMENTS

| DE | 9411004 U1 | 9/1994 |
|---|---|---|
| DE | 10007658 A1 | 10/2001 |

(Continued)

*Primary Examiner* — Keith J Frisby

(57) ABSTRACT

A hydraulic system includes a hydraulic pump. A first hydraulic shock is coupled to a first port of the hydraulic pump. A second hydraulic shock is coupled to a second port of the hydraulic pump. A first hydraulic cylinder is coupled to the first port of the hydraulic pump. A second hydraulic cylinder is coupled to the second port of the hydraulic pump. A first valve is coupled between the first hydraulic cylinder and second hydraulic cylinder. The first valve can be actuated by a computer system or can be a ball and spring check valve. A second valve is coupled between the first hydraulic cylinder and second hydraulic cylinder. A flow direction of the second valve is opposite a flow direction of the first valve. A first piston is disposed in the first hydraulic cylinder, and a second piston is disposed in the second hydraulic cylinder.

15 Claims, 21 Drawing Sheets

(56) References Cited

U.S. PATENT DOCUMENTS

| | | |
|---|---|---|
| 3,974,890 A | 8/1976 | Noble |
| 3,977,485 A | 8/1976 | West |
| 4,244,241 A | 1/1981 | Treadwell |
| 4,364,447 A | 12/1982 | Yoshida |
| 4,374,591 A | 2/1983 | Kobayashi |
| 4,546,997 A | 10/1985 | Smyers |
| 4,591,173 A | 5/1986 | Marier |
| 4,593,921 A | 6/1986 | Marier |
| 4,700,972 A | 10/1987 | Young |
| 4,716,732 A | 1/1988 | Tordoff |
| 4,723,464 A | 2/1988 | Welschof et al. |
| 4,826,184 A | 5/1989 | Kuehmichel et al. |
| 4,826,206 A | 5/1989 | Immega |
| 4,836,051 A | 6/1989 | Guimbretie |
| 4,840,087 A | 6/1989 | Welschof et al. |
| 4,927,169 A | 5/1990 | Scaduto |
| 5,041,069 A | 8/1991 | Horst |
| 5,162,026 A | 11/1992 | Krisher |
| 5,286,052 A | 2/1994 | Lukianov |
| 5,324,056 A | 6/1994 | Orton |
| 5,346,241 A | 9/1994 | Lee |
| 5,372,377 A | 12/1994 | Lee |
| 5,396,973 A | 3/1995 | Schwemmer et al. |
| 5,435,193 A | 7/1995 | Halliday |
| 5,435,408 A | 7/1995 | Sekinobu |
| 5,435,591 A | 7/1995 | Lee |
| 5,498,020 A | 3/1996 | Lee |
| 5,580,089 A | 12/1996 | Kolka |
| 5,620,199 A | 4/1997 | Lee |
| 5,664,649 A | 9/1997 | Thompson et al. |
| 5,700,025 A | 12/1997 | Lee |
| 5,704,868 A | 1/1998 | Lindsey et al. |
| 5,782,484 A | 7/1998 | Kuhn, Jr. |
| 5,916,052 A | 6/1999 | Dick |
| 5,916,055 A | 6/1999 | Wormbaecher |
| 6,039,337 A | 3/2000 | Urbach |
| 6,170,838 B1 | 1/2001 | Laurent et al. |
| 6,182,979 B1 | 2/2001 | Lee |
| 6,250,649 B1 | 6/2001 | Braun |
| 6,261,184 B1 | 7/2001 | Jacob et al. |
| 6,264,212 B1 | 7/2001 | Timoney |
| 6,267,387 B1 | 7/2001 | Weiss |
| 6,279,920 B1 | 8/2001 | Choudhery |
| 6,354,389 B1 | 3/2002 | Zaczkowski et al. |
| 6,386,553 B2 | 5/2002 | Zetterstrom |
| 6,406,036 B1 | 6/2002 | Laurent et al. |
| 6,805,362 B1 | 10/2004 | Melcher |
| 6,896,637 B2 | 5/2005 | Krude et al. |
| 6,960,148 B2 | 11/2005 | Fuchs et al. |
| 7,001,302 B2 | 2/2006 | Wachter et al. |
| 7,011,594 B2 | 3/2006 | Krude et al. |
| 7,014,004 B2 | 3/2006 | Etou |
| 7,131,650 B2 | 11/2006 | Melcher |
| 7,234,708 B2 | 6/2007 | Blondelet et al. |
| 7,252,616 B2 | 8/2007 | Wormsbaecher |
| 7,322,435 B2 | 1/2008 | Lillbacka et al. |
| 7,343,997 B1 | 3/2008 | Matthies |
| 7,802,800 B2 | 9/2010 | Melcher |
| 7,931,286 B2 | 4/2011 | Melcher |
| 8,387,740 B2 | 3/2013 | Melcher |
| 8,827,291 B2 | 9/2014 | Cronquist et al. |
| 9,145,037 B2 | 9/2015 | Hawksworth et al. |
| 9,545,976 B2 | 1/2017 | Melcher |
| 2008/0258415 A1 | 10/2008 | Melcher |
| 2010/0292016 A1 | 11/2010 | Wormsbaecher et al. |
| 2011/0121524 A1 | 5/2011 | Kamioka et al. |
| 2012/0098225 A1 | 4/2012 | Lucas |
| 2014/0238763 A1 | 8/2014 | Melcher |
| 2014/0312580 A1 | 10/2014 | Gale |

FOREIGN PATENT DOCUMENTS

| | | |
|---|---|---|
| FR | 2121813 | 8/1972 |
| GB | 2155410 A | 9/1985 |
| JP | 01311907 | 12/1989 |
| JP | 05085133 | 4/1991 |
| JP | 03279010 | 12/1991 |
| JP | 06064438 | 8/1992 |
| WO | 9515865 | 6/1995 |
| WO | 9637375 | 11/1996 |
| WO | 9849023 | 11/1998 |
| WO | 9959860 | 11/1999 |
| WO | 0038939 | 7/2000 |
| WO | 02058949 A1 | 8/2002 |
| WO | 2004098916 A1 | 11/2004 |

\* cited by examiner

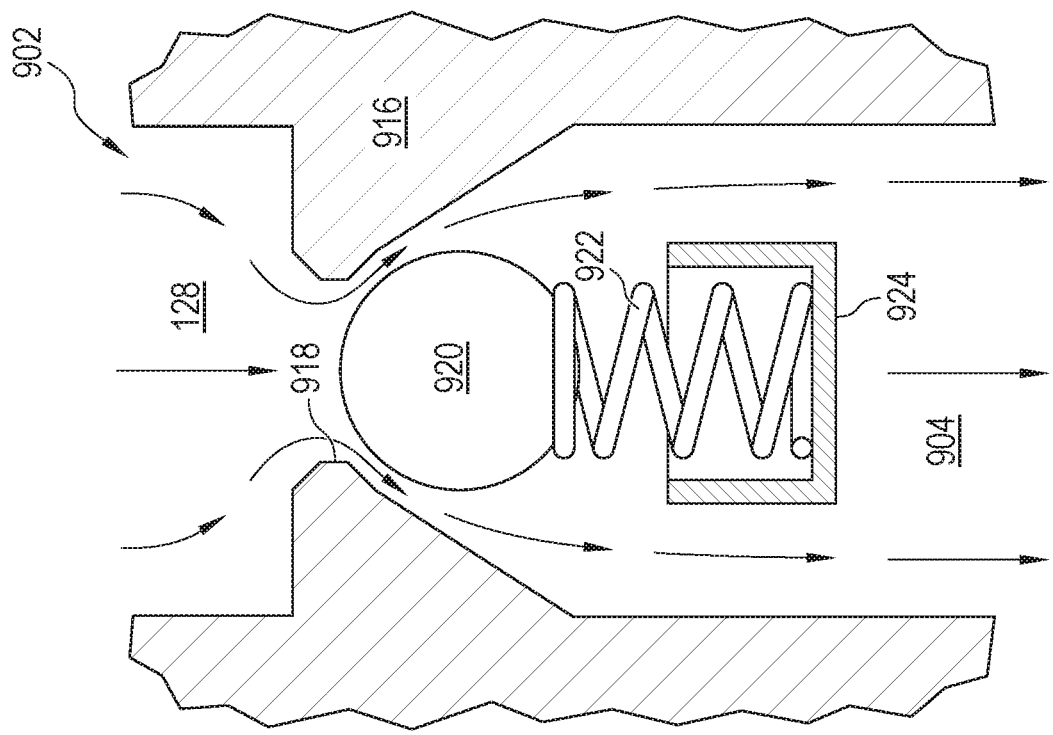
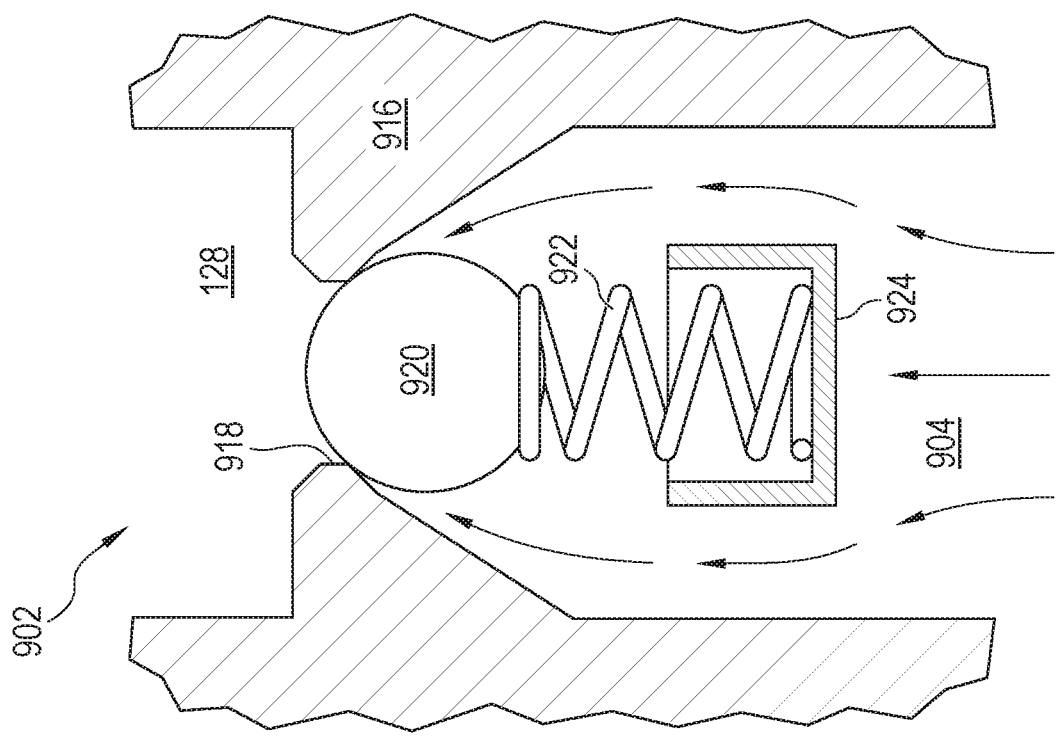

HYDRAULIC BYPASS SYSTEM

CLAIM OF DOMESTIC PRIORITY

The present application claims the benefit of U.S. Provisional Application No. 62/332,893, filed May 6, 2016, which application is incorporated herein by reference.

FIELD OF THE INVENTION

The present invention relates to hydraulic systems, and more particularly to a bypass system used with a hydraulic pump.

BACKGROUND OF THE INVENTION

Vehicles with leaning capability have improved performance and safety. One embodiment of a leaning vehicle, illustrated as a snowmobile 10, is illustrated in FIG. 1a. While a snowmobile is specifically illustrated, similar leaning suspensions are used on other types of vehicles, e.g., cars, trucks, off-road vehicles, all-terrain vehicles, etc. Snowmobile 10 leans into turns so that skis 30 and 32 carve through snow similar to a skier's skis. Leaning of snowmobile 10 is facilitated by a front suspension 34, shown separate from the snowmobile in FIG. 1b, which attaches skis 30 and 32 to snowmobile 10 and actuates the skis. Hydraulic shocks 68 and 88 are used by suspension 34 to actuate suspension arms 64 and 66. Suspension arms 64 and 66 each forms a parallelogram that is leaned over by force of hydraulic shocks 68 and 88 to lean snowmobile 10. FIG. 1c illustrates hydraulic shock 68 expanded, and hydraulic shock 88 collapsed, to lean suspension 34 toward the right of snowmobile 10. Snowmobile 10 is leaned toward the left by expanding shock 88 and collapsing shock 68.

FIG. 1d illustrates hydraulic system 120 that leans suspension 34 by actuating hydraulic shocks 68 and 88. Pump assembly 126 includes electric motors and a hydraulic pump that modify hydraulic pressure in the system to actuate hydraulic shocks 68 and 88. Hydraulic fluid is pumped out of shock 68 and into shock 88 to collapse shock 68 and expand shock 88. FIG. 1e illustrates details of pump assembly 126 from FIG. 1d in one embodiment. Electric motors 260 are controlled by a computer system. Electric motors 260 operate hydraulic pump 262 through pulleys 266 and 268, connected by belts 270. When pulley 268 is turned, hydraulic pump 262 pulls hydraulic fluid from one hose 128 and forces the hydraulic fluid out a second hose 128. Changing the direction that pulley 268 is turned changes which hose 128 is losing fluid and which is receiving additional fluid. In some embodiments, an electric motor and hydraulic pump are coupled without using belts, e.g., by direct coupling to a common shaft or by other suitable means.

As illustrated, hydraulic system 120 is a closed system. All hydraulic fluid transferred between shock 68 and shock 88 is forced through hydraulic pump 262. During some input events to suspension 34, one hydraulic shock 68 or 88 may be under significantly elevated hydraulic pressure. An input event to the suspension system can be a change in terrain, e.g., a rock or bump hit by the snowmobile, which applies a significant force to the system. The elevated pressure forces hydraulic fluid through the pump and shocks at an increased rate that heats the hydraulic fluid, reduces efficiency, and increases wear and tear on hydraulic pump 262.

Functioning of suspension 34 is more thoroughly explained in U.S. patent application Ser. No. 14/191,292 filed Feb. 26, 2014, now U.S. Pat. No. 9,545,976 issued Jan. 17, 2017, the disclosure of which is incorporated herein by reference.

BRIEF DESCRIPTION OF THE DRAWINGS

FIGS. 3a-3b illustrate operation of one check valve embodiment usable in the bypass system;

DETAILED DESCRIPTION OF THE DRAWINGS

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings. While a snowmobile is illustrated, the bypass system is compatible with other leaning vehicles that utilize a hydraulic actuating system. The bypass system may also be used in hydraulic systems that are used in other situations besides actuating a leaning suspension of a vehicle.

Figure 1A:
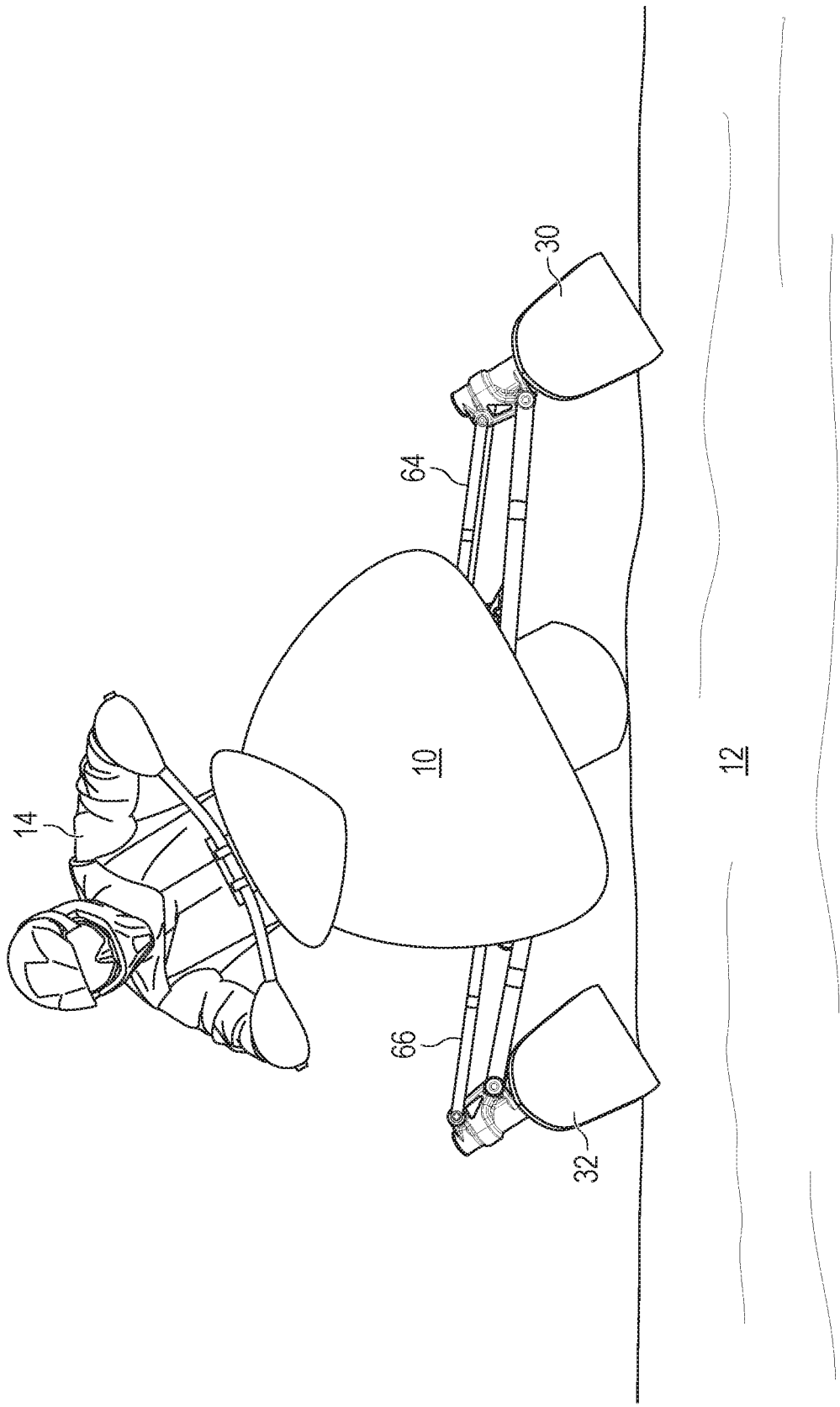
FIGS. 1a-1e illustrate a vehicle having a leaning suspension with hydraulic actuation.
Figure 1B:
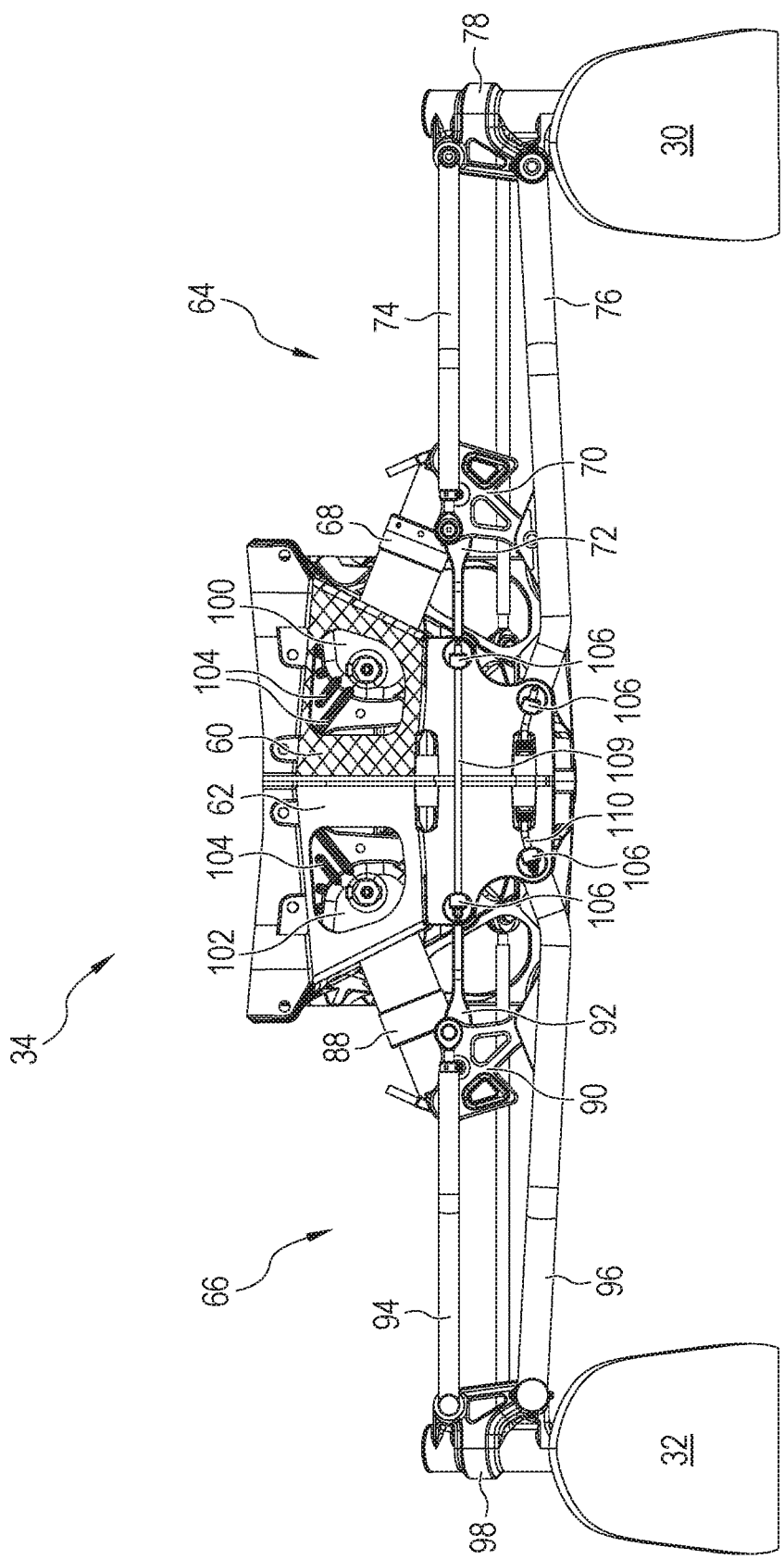
Figure 1C:
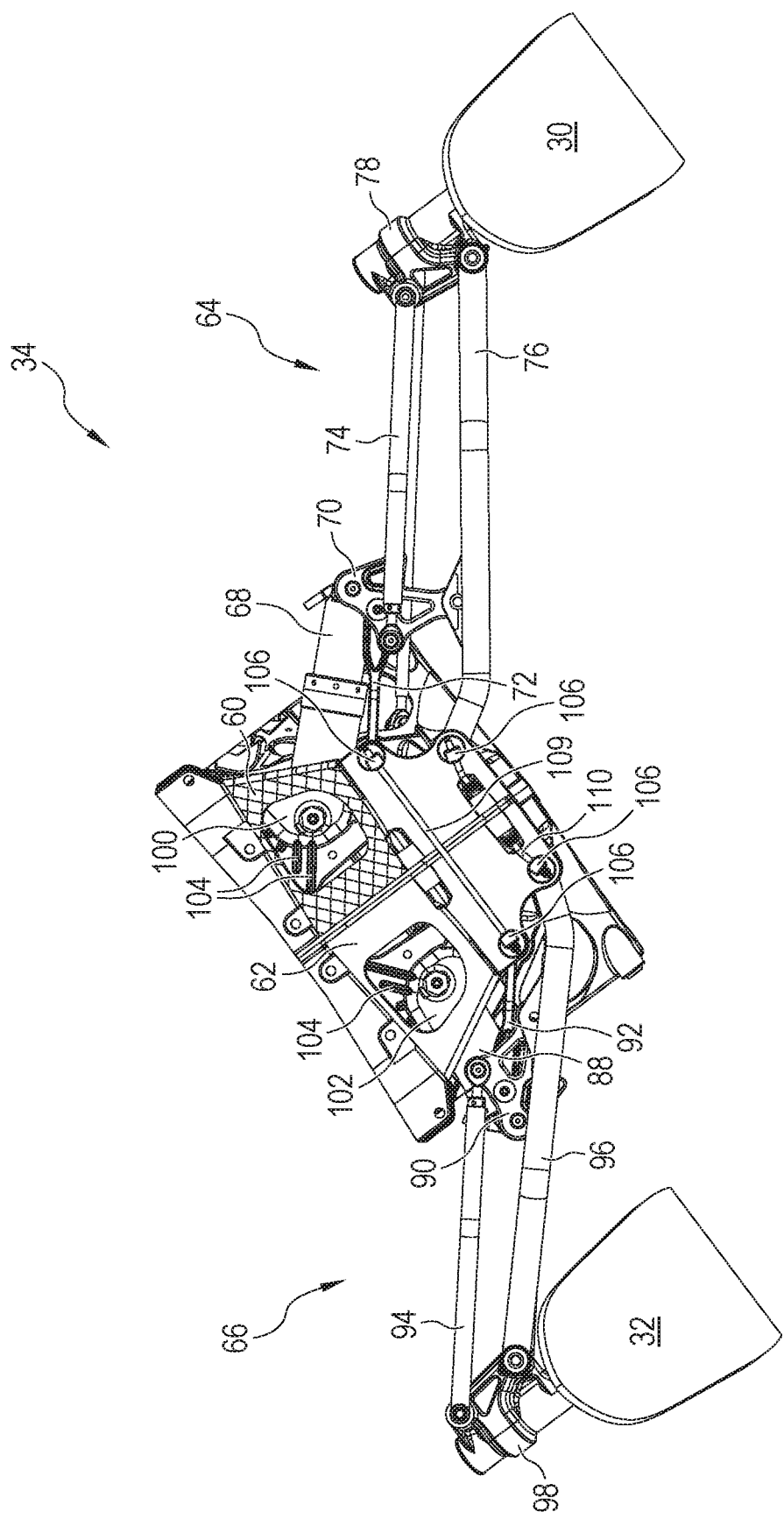
Figure 1D:
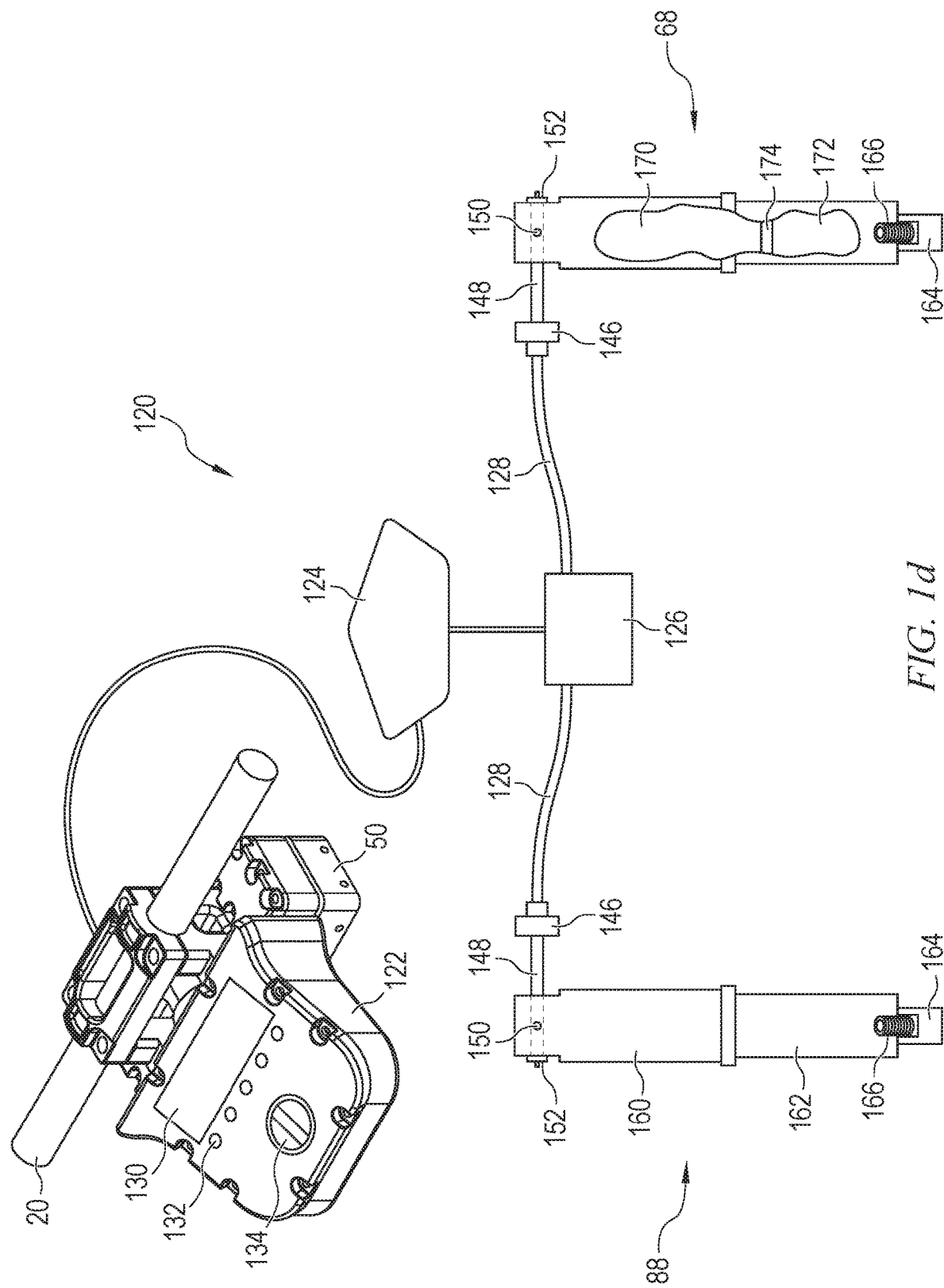
Figure 1E:
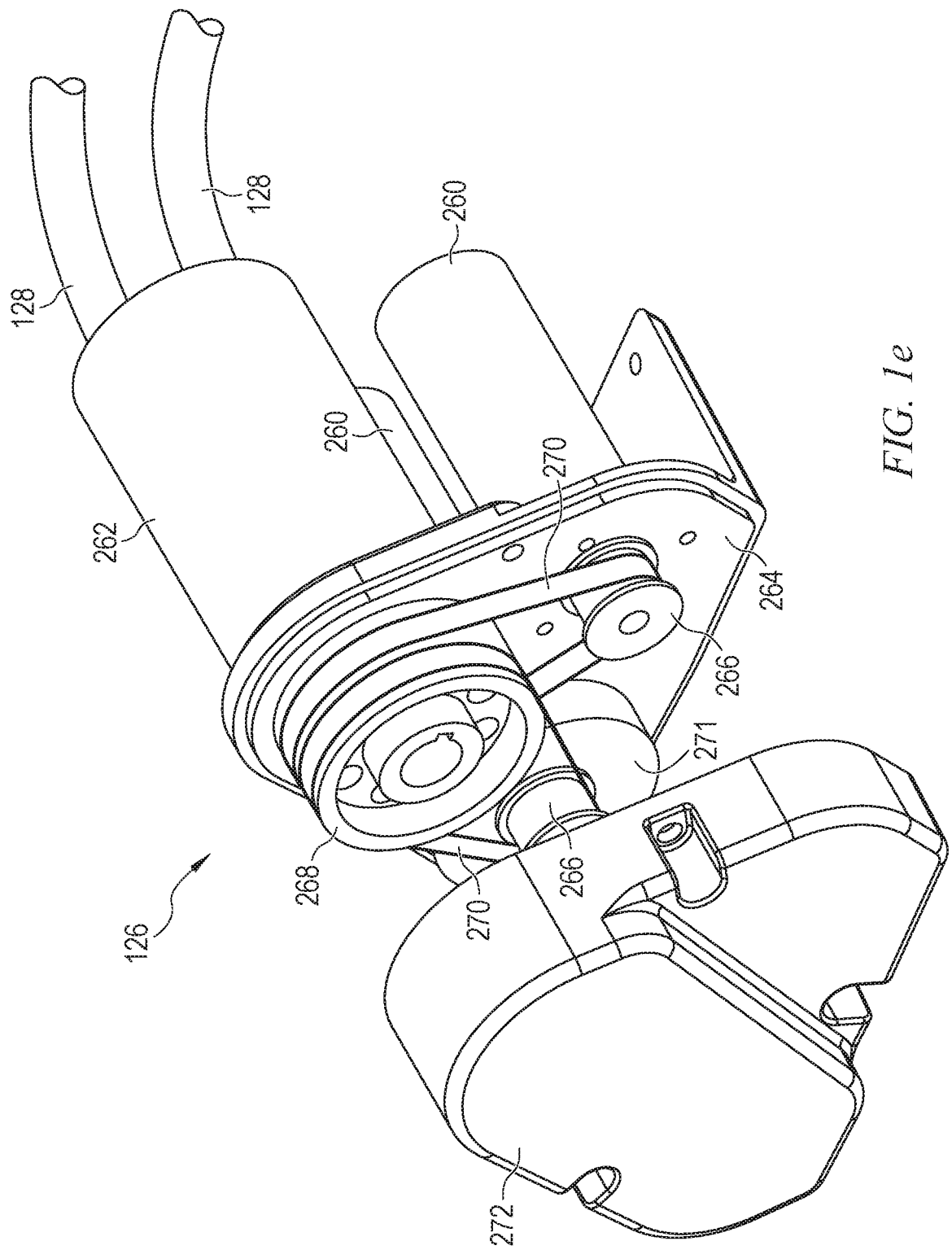
Figure 2A:
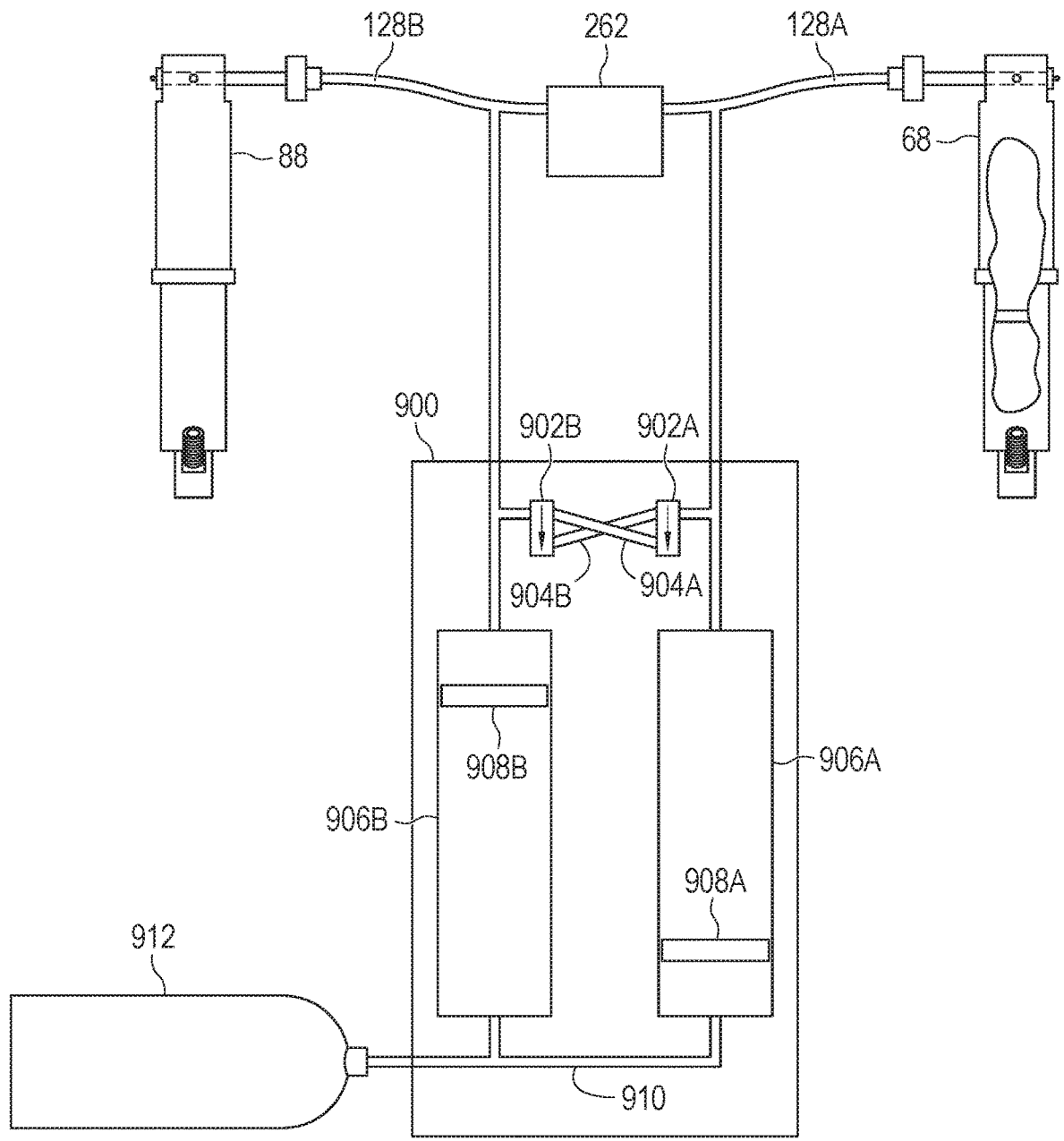
FIGS. 2a-2b illustrate block diagrams of a bypass system coupled to the hydraulic system of the leaning suspension.

FIG. 2a illustrates hydraulic system 120 from FIG. 1d with a passive bypass system 900 attached between shocks 68 and 88 in parallel with hydraulic pump 262. Bypass system 900 includes check valves 902, which allow hydraulic fluid to be bypassed between the two sides of hydraulic system 120. Check valve 902A allows hydraulic fluid to flow from shock 68 to shock 88 through hoses 128 when the hydraulic pressure of shock 68 is sufficiently high relative to the hydraulic pressure in shock 88 to open check valve 902A. Check valve 902B allows hydraulic fluid to flow from shock 88 to shock 68 through hoses 128 when the hydraulic pressure of shock 88 is sufficiently high relative to the hydraulic pressure in shock 68 to open check valve 902B. When the hydraulic pressures in shocks 68 and 88 are within a normal or desired range of each other, neither of check valves 902 are open, and no hydraulic fluid bypasses hydraulic pump 262 through bypass system 900. In passive systems, the maximum pressure seen at the ports of hydraulic pump 262 is set by the spring pressure in check valves 902.

Check valves 902 are connected in parallel with each other, and with hydraulic pump 262, between shock 68 and shock 88. Check valves 902A and 902B are oriented in opposite directions so that each check valve allows flow in an opposite direction from the other. Operation of check valves 902 is described below with reference to FIGS. 3a-3b.

Bypass system 900 allows hydraulic fluid to bypass hydraulic pump 262 when an external event input to hydraulic system 120 raises the hydraulic pressure in one of the shocks 68 or 88 to an undesirable level. Bypass system 900 limits the pressure applied to hydraulic pump 262 to approximately a maximum pressure set by configuring check valves 902 to turn on at or about the maximum desired hydraulic pressure.

Pathways 904A and 904B are used within bypass system 900 to couple check valves 902 to each other. Pathway 904A couples the bottom, or downstream, side of check valve 902A to the top, or upstream, side of check valve 902B. Pathway 904B couples the bottom side of check valve 902B to the top side of check valve 902A. When check valve 902A turns on, hydraulic fluid flows through check valve 902A and pathway 904A to the top side of check valve 902B and to the shock 88 side of hydraulic system 120. The elevated pressure at the upstream side of check valve 902A is transferred through pathway 904B to help keep check valve 902B closed. When check valve 902B turns on, hydraulic fluid flows through check valve 902B and pathway 904B to the top side of check valve 902A and to the shock 68 side of hydraulic system 120.

Bypass system 900 includes hydraulic reservoirs or cylinders 906 that allow for hydraulic fluid to be removed from or added back into hydraulic system 120. Hydraulic cylinder 906A is coupled to the shock 68 side of hydraulic system 120, and hydraulic cylinder 906B is coupled to the shock 88 side of the hydraulic system. Hydraulic cylinder 906A includes a piston 908A and hydraulic cylinder 906B includes a piston 908B. Pistons 908 slide up and down freely within their respective hydraulic cylinders as the relative pressures above and below the pistons change. Pistons 908 operate within hydraulic cylinders 906 similarly to floating pistons 174 in shocks 68 and 88.

Hydraulic cylinders 906 allow hydraulic fluid to be removed from and added back into hydraulic system 120. Modifying the amount of hydraulic fluid in hydraulic system 120 allows control of the spring rate of shocks 68 and 88. As shocks 68 and 88 are extended by external forces, the spring rate is reduced by a reduction in the pressure within the shocks. As the suspension extends, spring rate and mechanical leverage is reduced. Bypass system 900 adds hydraulic fluid from hydraulic cylinders 906 to shocks 68 and/or 88 to substantially maintain piston position within the shocks and spring rate of the shocks.

As shocks 68 and 88 are compressed by external forces, the spring rate is increased by the increase of hydraulic pressure in the shocks. Removing hydraulic fluid from hydraulic system 120 keeps the spring rate of shocks 68 and 88 at comfortable levels. The accumulation of hydraulic fluid in cylinders 906 as the fluid is forced out of shocks 68 and/or 88 reduces or maintains the spring rate of the shocks. The force of fluid into and out of cylinders 906, and the accompanying thermal transfer from the fluid to the cylinders, provides control of the suspension through the first half of suspension travel.

Hydraulic cylinders 906 are each coupled through hose or pathway 910 to air canister 912. Air canister 912 contains compressed air to apply pressure to pistons 908 opposite shocks 68 and 88. Hydraulic cylinders 906 provide room for hydraulic fluid to be removed from and then added back into hydraulic system 120. Compressed air from canister 912 helps balance hydraulic pressure in hydraulic system 120 and bypass system 900, which regulates when, and how much, hydraulic fluid flows between hydraulic system 120 and bypass system 900.

As suspension 34 experiences events that apply force to hydraulic shocks 68 and 88, the hydraulic pressure within the shocks is transferred to bypass system 900 through hoses 128. If one side of suspension 34 sees increased pressure, the pressure increases through the associated hose 128 to the associated side of bypass system 900 forcing additional hydraulic fluid into that side of the bypass system. Increasing the pressure over the cracking pressure of the associated check valve 902 will cause hydraulic fluid to be transferred to the other side of hydraulic system 120 in addition to being transferred to bypass system 900. If one side of suspension 34 sees reduced pressure, the pressure reduces through the associated hose 128 to the associated side of bypass system 900 and draws hydraulic fluid from that side of the bypass assembly.

Air canister 912 applies counter-pressure to pistons 908. The pressure applied by air canister 912 forces additional hydraulic fluid into hydraulic system 120 when hydraulic pressure in one or both sides of hydraulic system 120 is decreased. In some cases, snowmobile 10 may go airborne, in which case both sides of suspension 34 fall. Both sides of hydraulic system 120 see significantly reduced pressure. The pressure in both hoses 128 is reduced, which propagates to hydraulic cylinders 906 above their respective pistons 908. Air canister 912 applies counter-pressure to force spare hydraulic fluid from hydraulic cylinders 906 into hydraulic shocks 68 and 88 through hoses 128. The additional fluid increases the spring rate of shocks 68 and 88 when snowmobile 10 initially contacts the ground. Without forcing additional fluid into hydraulic shocks 68 and 88 with air canister 912, suspension 34 would have a significantly reduced spring rate on initial contact. The suspension would not apply significant force back to the ground until returning to approximately the same position the suspension was in before leaving the ground.

Air canister 912 is initially provided with a pressure equivalent to the pressure in shocks 68 and 88 while the vehicle is stationary, so that the entire system is in equilibrium when at rest. When snowmobile 10 gets air, the pressure in air canister 912 is significantly higher than the hydraulic pressure in shocks 68 and 88, and the air canister forces additional hydraulic fluid into hydraulic system 120 to keep the spring rate of suspension 34 from falling below desired levels. In one embodiment, the volume of air canister 912 is set such that when suspension 34 extends, spring rate is maintained at useful levels. Suspension 34 is fully extended while snowmobile 10 is in the air, and then the suspension collapses when landing. Hydraulic fluid is forced back into bypass system 900 to absorb the energy of the suspension landing event. Pressure between air canister 912 and hydraulic system 120 equalizes as suspension 34 returns to the normal position. Bypass system 900 provides rebound and compression damping for suspension 34.

Figure 2B:
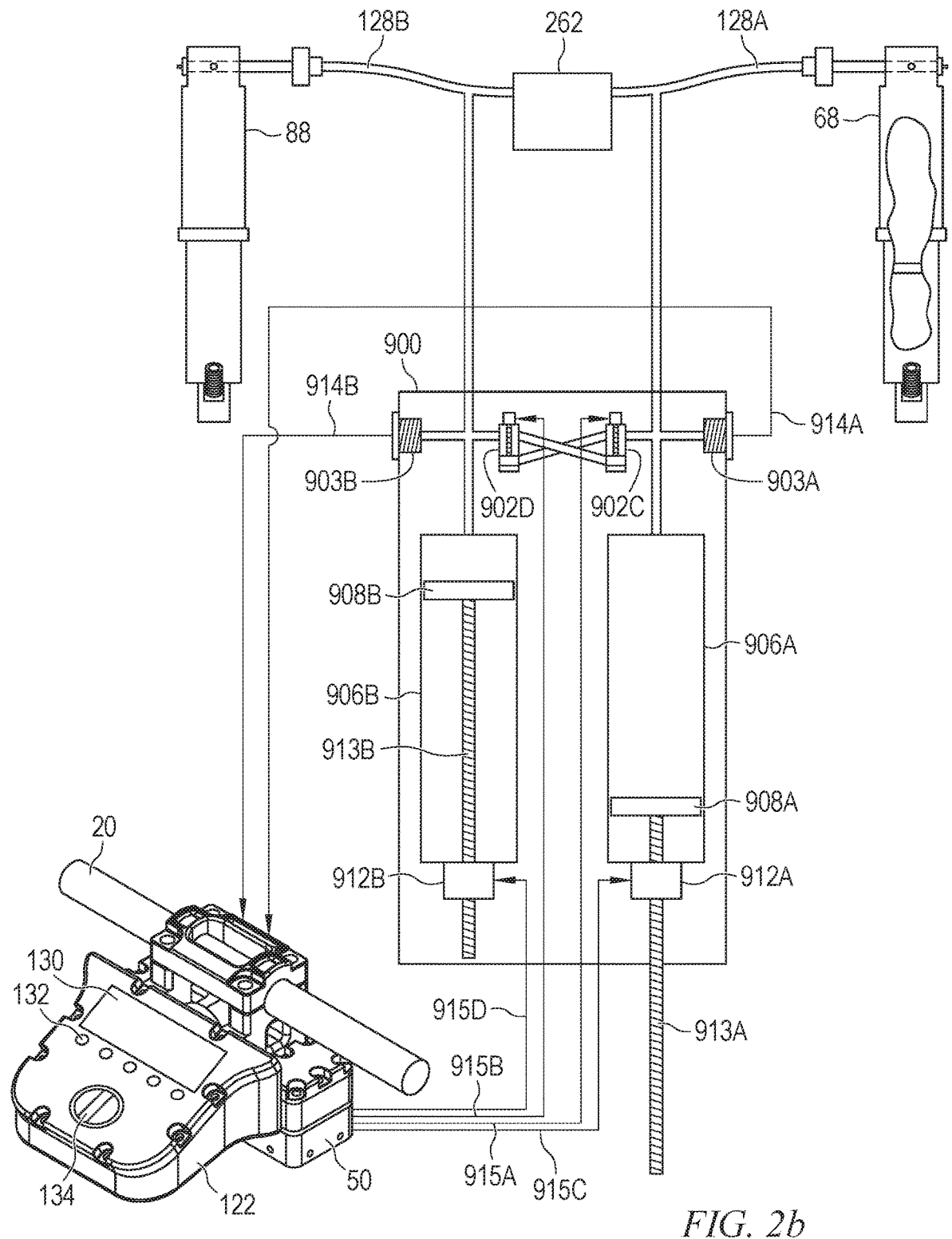

Using a larger air canister 912 to increase or maximize air volume in bypass system 900 helps reduce pressure or spring rate drop at shocks 68 and 88 during the first half of suspension travel. Air canister 912 provides a passive system for adding or removing hydraulic fluid from hydraulic system 120. FIG. 2*b* illustrates an embodiment with air canister 912 replaced by electric motors 912 actuating pistons 908 through lead screws 913. Lead screws 913 extend through hollow shafts of motors 912. Lead screws 913 can be notched to prevent significant rotation of the lead screws within motors 912. Lead screws 913 can alternatively extend through pistons 908 rather than motors 912. Check valves 902A and 902B can also be replaced by lead screw systems 902C and 902D. In some active embodiments, check valves 902 remain as a safety measure in case of failure of the active valves.

The computer system within control panel 122, or located elsewhere, reads hydraulic pressure of the system through transducers 903. Transducers 903 are hydraulically coupled to hoses 128A and 128B to generate electrical signals 914 that provide information as to the present hydraulic pressure seen on each side of the system.

Control panel 122 uses the hydraulic pressure information 914 from transducers 903 to determine when to add or remove hydraulic fluid from hydraulic system 120, and when to bypass fluid between shocks 68 and 88. Control panel 122 outputs control signals 915C and 915D to turn lead screws 913 and actuate pistons 908, thus drawing fluid into or expelling fluid from cylinders 906. Control panel 122 outputs control signals 915A and 915B to open or close bypass lead screw systems 902C and 902D, thus bypassing hydraulic fluid between the two sides of the system when desirable.

Control panel 122 can use other data inputs besides only transducers 903 to determine how to operate valves 902 and motors 912. Control panel 122 can operate bypass system 900 based on vehicle speed, lean angle, four wheel steering, position, and attitude of the vehicle using accelerometers and gyros, as well as any other sensors distributed around the vehicle or on hydraulic system 120. Electrical current draw or the rotational speed of pump 262 can be detected to indicate system pressure. Pistons 908 are actively actuated to control the volume of hydraulic fluid within hydraulic system 120, the pressure within hydraulic shocks 68 and 88, the spring rate of suspension 34, or whatever other characteristic is of concern. A computer system observes hydraulic pressure fluctuations using transducers 903, as well as outputs of other various sensors placed around the vehicle, and makes decisions about how much fluid to bypass. Active bypass potentially increases efficiency by allowing more accurate control of the amount and timing of fluid bypassed.

In some embodiments, valves 902 and motors 912 are controlled by the computer system in control panel 122 based on a light imaging, detection, and ranging (LIDAR) system disposed on snowmobile 10. The LIDAR system can scan terrain 12 in front of snowmobile 10 and automatically reconfigure hydraulic system 120 and bypass system 900 to compensate for upcoming hazards or changes of terrain 12 in advance. The LIDAR system can also detect oncoming vehicles and extend suspension 34 to avoid or reduce injury from the vehicles. Extending suspension 34 toward hazards can help the suspension be used to protect rider 14. Suspension 34 has an active role in protecting passengers and improving ride quality.

FIGS. 3a-3b illustrate operation of check valves 902A and 902B. Check valves 902 are illustrated in an implementation using ball check valves, but other types of check valves are used in other embodiments. A check valve 902 is coupled to a hose 128 at the upstream side of the check valve, and coupled to a hydraulic pathway 904 at the downstream side. Check valve 902 includes a container 916 that holds the parts of the check valve together and guides hydraulic fluid through the system. Container 916 includes a seat 918 that forms a circle around the inside of the container. When check valve 902 is closed, ball 920 contacts seat 918 in a full circle to create a seal. Spring 922 presses against ball 920 and base 924. Spring 922 applies a force to ball 920 to help keep the seal between the ball and seat 918 when the upstream and downstream pressure are within close proximity.

FIG. 3a illustrates check valve 902 with hydraulic pressure in hydraulic pathway 904 greater than the hydraulic pressure in hose 128. The hydraulic fluid in pathway 904 applies addition force, along with spring 922, against ball 920. Ball 920 maintains a seal with seat 918 and substantially prevents flow of hydraulic fluid from pathway 904 to hose 128.

FIG. 3b illustrates check valve 902 with the hydraulic pressure in hose 128 substantially higher than the hydraulic pressure in pathway 904. Ball valve 902 opens when the pressure of hydraulic fluid in hose 128 is sufficiently above the pressure of pathway 904 to counteract the force of spring 922 and create a separation between ball 920 and seat 918. The pressure required in hose 128, relative to the pressure in pathway 904, to open check valve 902 is called the cracking pressure of the check valve. The cracking pressure of ball check valve 902 is configured to set the desired maximum pressure for a side of hydraulic system 120.

Figure 4A:
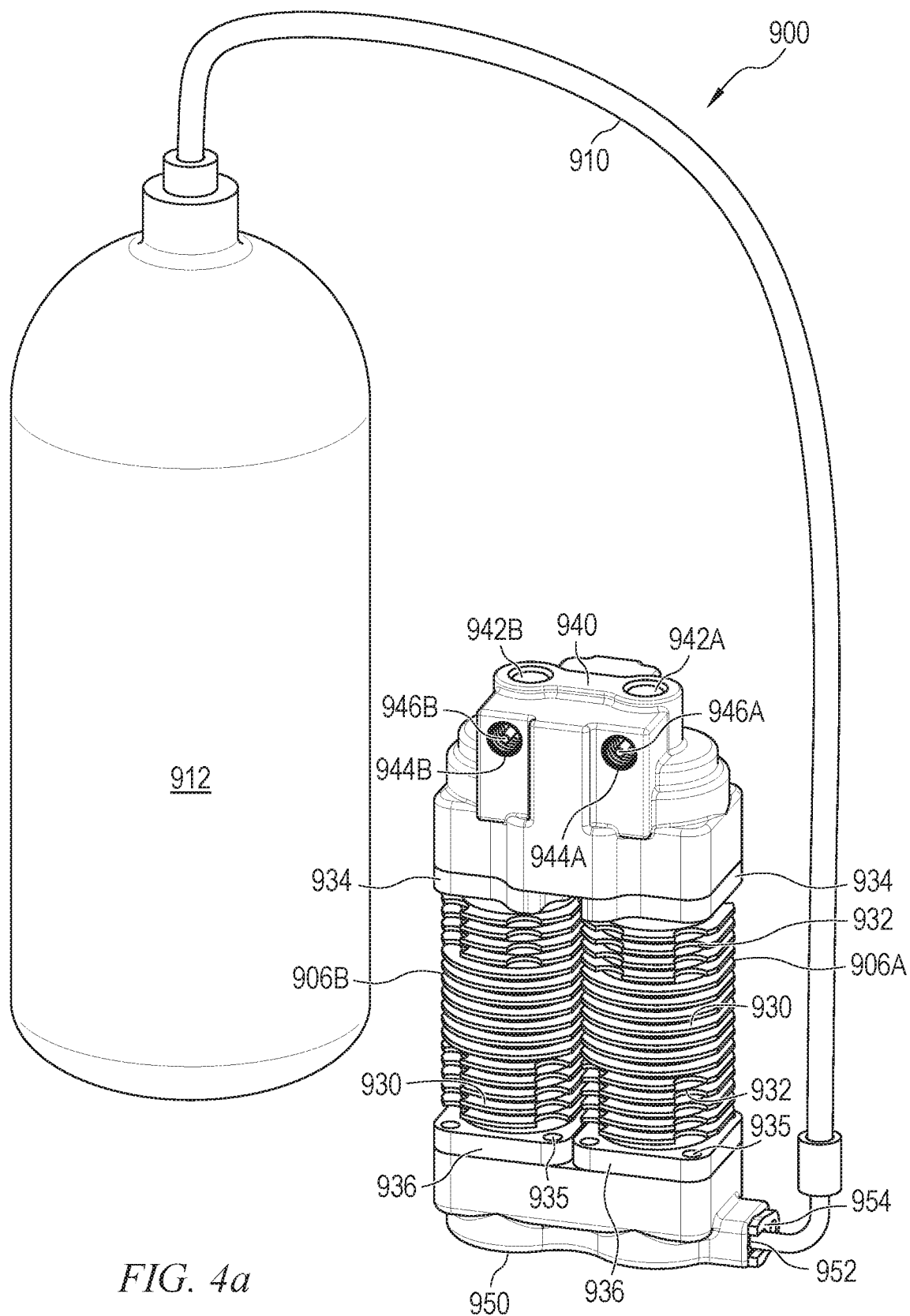
FIGS. 4a-4b illustrate perspective views of one physical implementation of the bypass system.
Figure 4B:
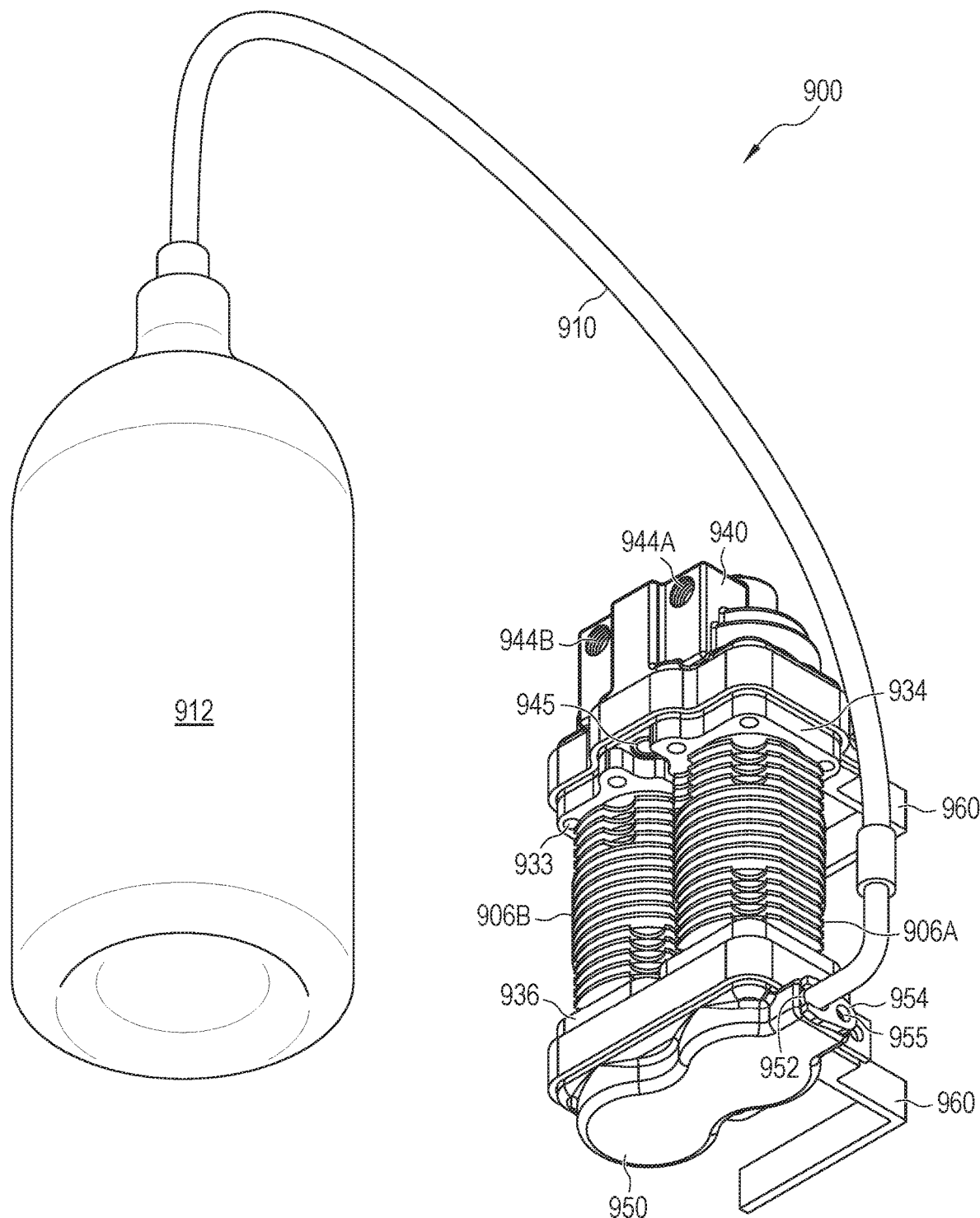

FIGS. 4a and 4b illustrate one physical implementation of bypass system 900 in two different perspective views. Bypass system 900 includes cylinders 906 oriented in parallel and physically mounted or coupled between a manifold or valve block 940 and air distribution block or cap 950. In one embodiment, cylinders 906, manifold 940, and cap 950, are separately manufactured using 3d-printing, molding, or other suitable manufacturing technique and then assembled together. Cylinders 906, manifold 940, and cap 950 can be manufactured from titanium, titanium alloys, steel, aluminum, plastic, or another suitable material.

Cylinders 906 include air cooling fins 930 disposed around the cylinders. Air cooling fins 930 are generally formed as an integral part of the cylinders, but can be attached after the cylinders are manufactured. Fins 930 are formed of a similar material to the cylinders themselves, with good heat transferring qualities, to facilitate heat transfer from hydraulic fluid within the cylinders to the fins. Heat is transferred from the fins to ambient air around cylinders 906. Cooling the hydraulic fluid through fins 930 improves performance of hydraulic pump 262.

Fins 930 near the tops and bottoms of cylinders 906 include cutouts 932 to allow room for inserting screws or bolts to attach the cylinders to cap 950 and manifold 940. Cylinders 906 include screw holes 933 through base plate 934, and screw holes 935 through base plate 936, for attaching the cylinders to manifold 940 and cap 950, respectively. In one embodiment, cylinders 906, fins 930, and base plates 934 and 936 are all separately formed of a uniform piece of material by 3D-printing a metal such as copper, steel, titanium, plastic, or another appropriate metal, metal alloy, polymer, etc. Bolts are inserted through openings 935 of base plate 936 and turned to mate with threaded openings of cap 950. Bolts are inserted through openings 933 of base plate 934 and turned to mate with threaded openings of manifold 940.

Manifold 940 includes openings 942 on top of the manifold opposite cylinders 906 for attachment of hoses 128 from hydraulic system 120. Hoses 128 can be attached by a threading of the hoses corresponding to threading inside of openings 942. In another embodiment, the ends of hoses 128 include flanges, and a metal bracket is bolted onto the top of manifold 940 to hold in the hoses by their respective flanges. Other appropriate attachment mechanisms are used in other embodiments. Internal pathways of manifold 940 hydraulically couple hoses 128 at openings 942 to respective cylinders 906. Manifold 940 also includes check valves 902, as well as pathways 904, as illustrated below. Check valves 902 are inserted into openings 945 of manifold 940 and held in place by threading between the manifold and bases 924.

Openings 944 are coupled to the pathway between openings 942 and cylinders 906. Openings 944 allow for observation of the hydraulic pressure at each cylinder. Pressure transducers 903 are threaded into openings 944 and used to convert the pressure on each side of the system to an electrical signal. The pressure at hoses 128 is transferred to transducers 903 through pathways 946. Openings 944 and transducers 903 are optional in the passive system, because the system operates automatically based on the counter-pressure provided by air canister 912. In the passive system, pressure readings from transducers 903 can be used for troubleshooting or monitoring, but are not necessary for the functionality of the system. In active systems, where pistons 908 and/or valves 902 are actuated by a computer system, transducers 903 in openings 944 provide input to the algorithm that operates the pistons and valves.

Cap 950 couples the bottom sides of each cylinder 906 to air canister 912 via opening 952. The end of hose 910 includes a flange that is held into place by bracket 954. A bolt is inserted through opening 955 of bracket 954 to attach the bracket to cap 950. Cap 950 distributes air pressure from canister 912 to the bottom sides of both cylinders 906. The air pressure presses on the bottom sides of pistons 908 to provide a counter to the hydraulic pressure from hydraulic system 120. Brackets 960 allow attachment of bypass system 900 to snowmobile 10, another vehicle with a leaning suspension, or another substrate where use of the bypass functionality is desired.

Figure 5A:
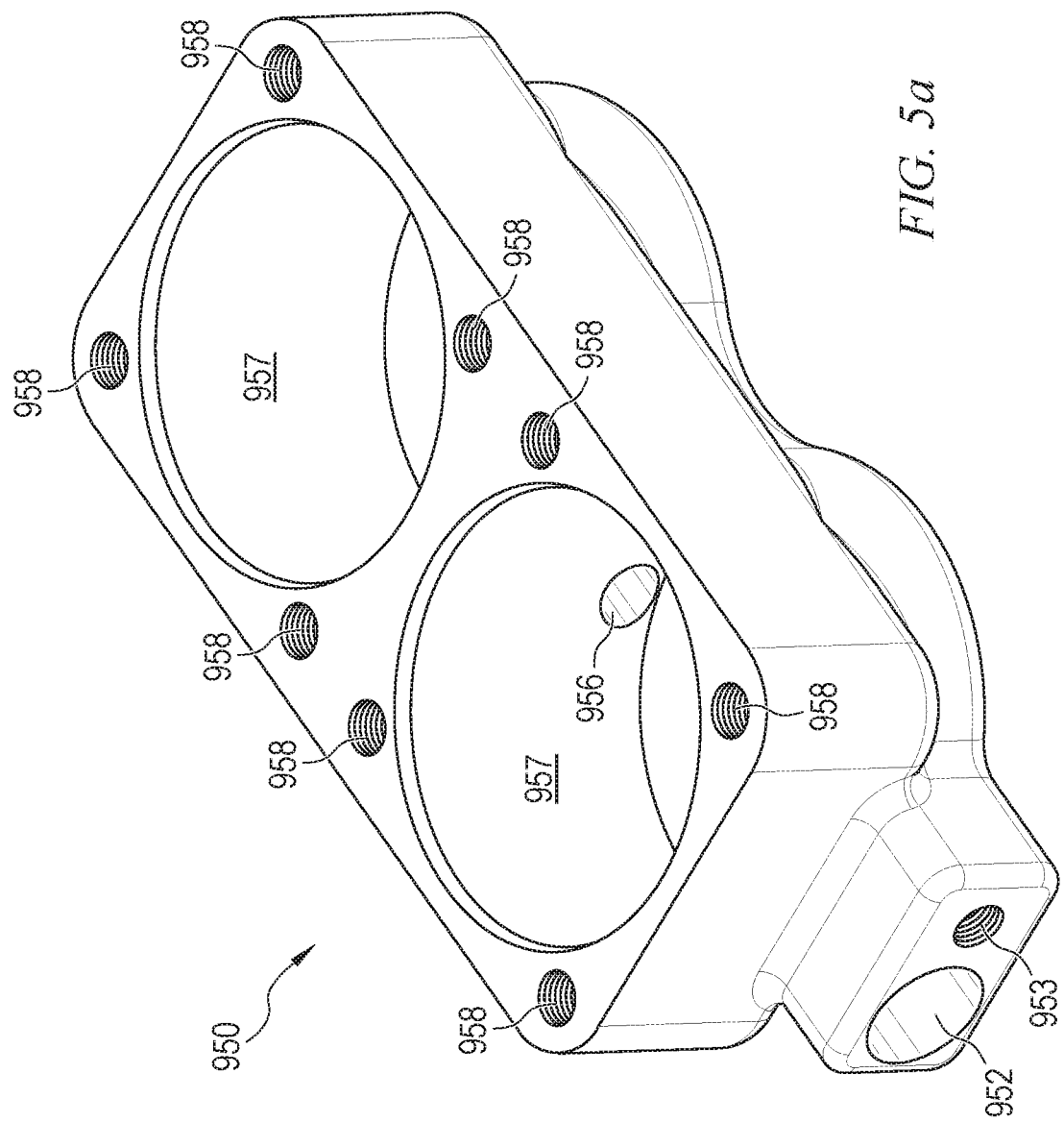
FIGS. 5a-5j illustrate various cross-sectional and exploded views of the bypass system implementation.

FIGS. 5a-5j illustrate details of the components of bypass system 900. FIG. 5a shows cap 950 separate from bypass system 900. Opening 952 allows airflow between canister 912 and cylinders 906. Opening 953 is threaded to allow attachment of bracket 954 by a bolt. Opening 956 extends between the two cylinder openings 957 of cap 950. Cylinder 906A is inserted into or attached over one cylinder opening 957, and cylinder 906B is inserted into or attached over the second cylinder opening. Opening 956 allows the air pressure under each piston 908 to equalize. Opening 952 allows the pressure in air canister 912 to equalize with cylinders 906. Openings 958 are threaded to allow attachment of cylinders 906 via bolts inserted through openings 935.

Figure 5B:
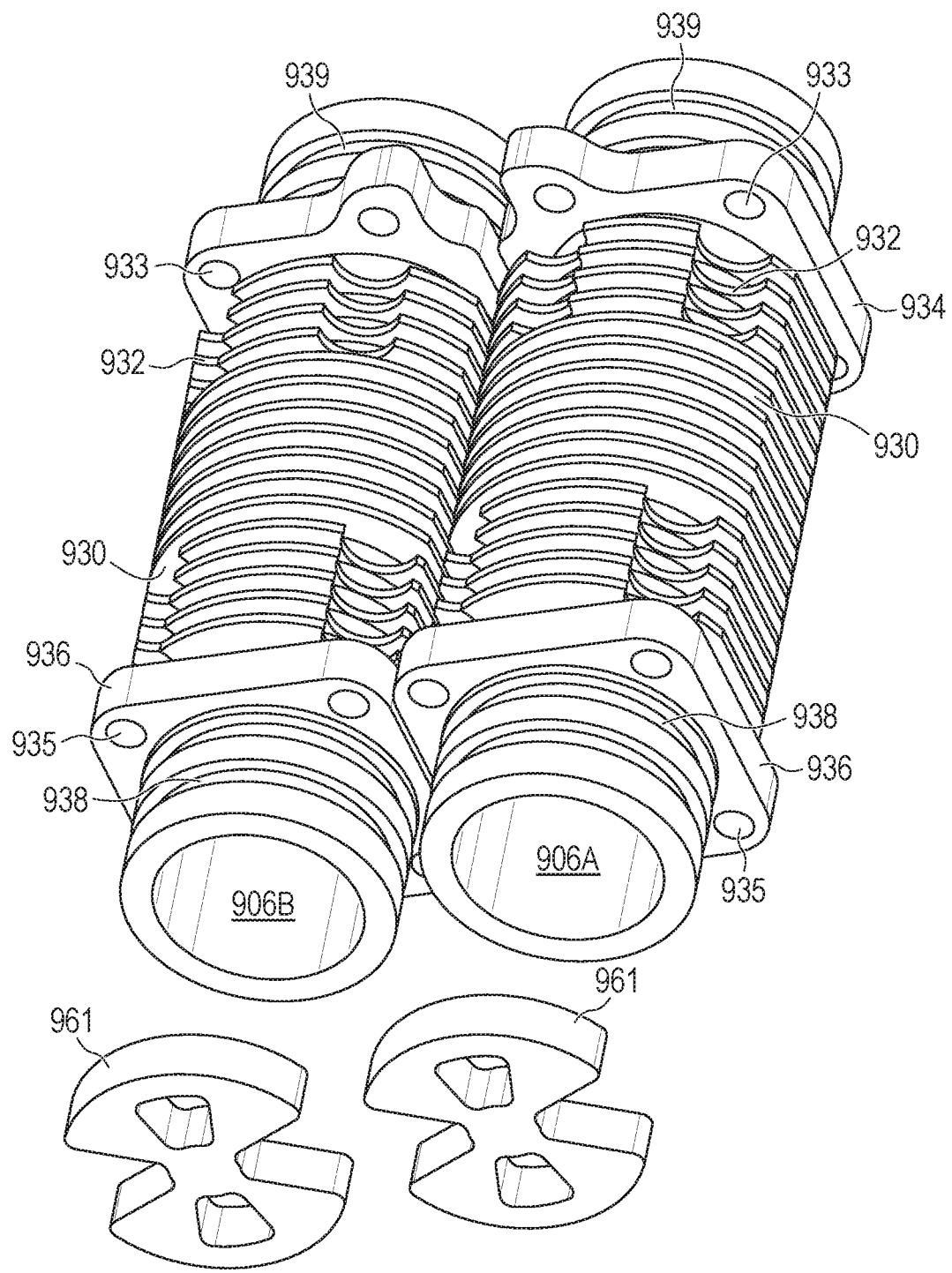

FIG. 5b illustrates spacers 961, which are inserted into cylinder openings 957 of cap 950 below cylinders 906. Spacers 961 provide proper spacing between cap 950 and cylinders 906. A seal is created between cap 950 and cylinders 906 by O-rings inserted into grooves 938. The O-rings are press-fit between cap 950 and cylinders 906. O-rings in grooves 939 provide a similar seal between manifold 940 and cylinders 906. Spacers 961 are also shaped to ensure proper air flow between cylinder openings 957 and canister 912, as seen in FIG. 5d. In some embodiments, spacers 961 are formed from urethane, or other similar material, and provide cushioning for pistons 908 hitting cap 950.

Figure 5C:
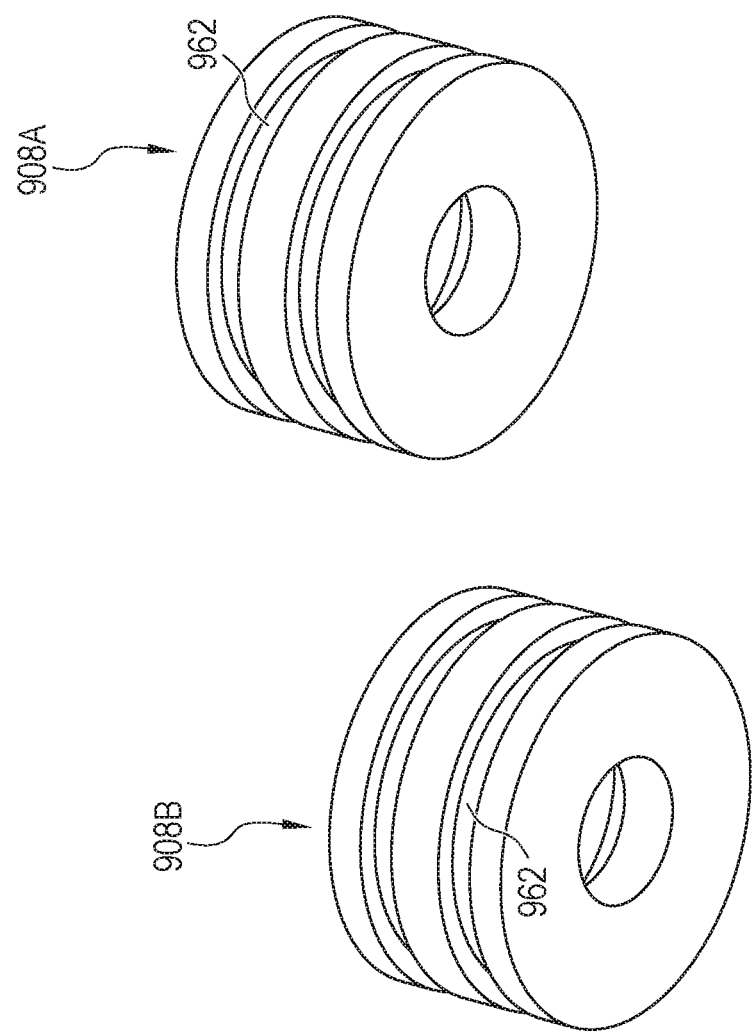
Figure 5D:
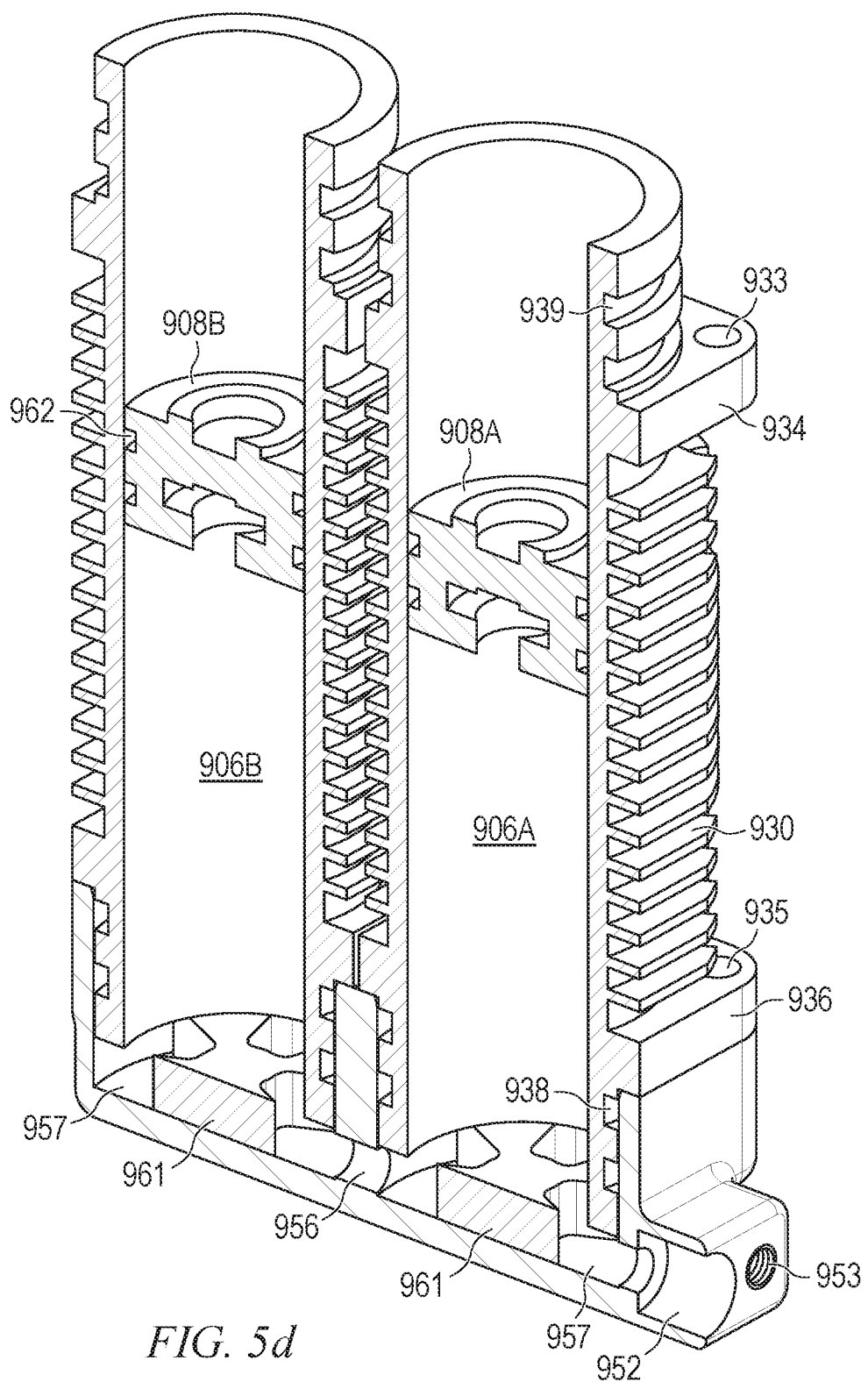

FIG. 5c illustrates pistons 908, which are inserted into cylinders 906. Grooves 962 are configured to hold O-rings around pistons 908. The O-rings create a seal within cylinders 906 at pistons 908 that helps keep hydraulic fluid above the pistons separate from air below the pistons.

FIG. 5d illustrates a cross section of cap 950, spacers 961, cylinders 906, and pistons 908 assembled. Spacers 961 are inserted into cap 950, and then cylinders 906 are inserted over the spacers and bolted down. Spacers 961 are shaped to provide ample air flow between air canister 912 to both cylinders 906 through openings 952 and 956. Pistons 908 float within respective cylinders 906.

In one embodiment, pistons 908 rest on spacers 961 when snowmobile 10 is at rest. In another embodiment, pressure in air canister 912 is increased such that pistons 908 float within cylinders 906 when snowmobile 10 is at rest. Cylinders 906 of bypass system 908 then operate as part of the primary suspension of snowmobile 10 along with shocks 68 and 88. Bypass system 900 is turned into a supplement for suspension 34. Any movement of suspension 34 will cause movement of pistons 908, the effect of which can be used to tune the suspension for different scenarios. Having air volume in bypass system 900 exceed the air volume in shocks 68 and 88 aids in using bypass system 900 as part of the primary suspension in desired situations.

Figure 5E:
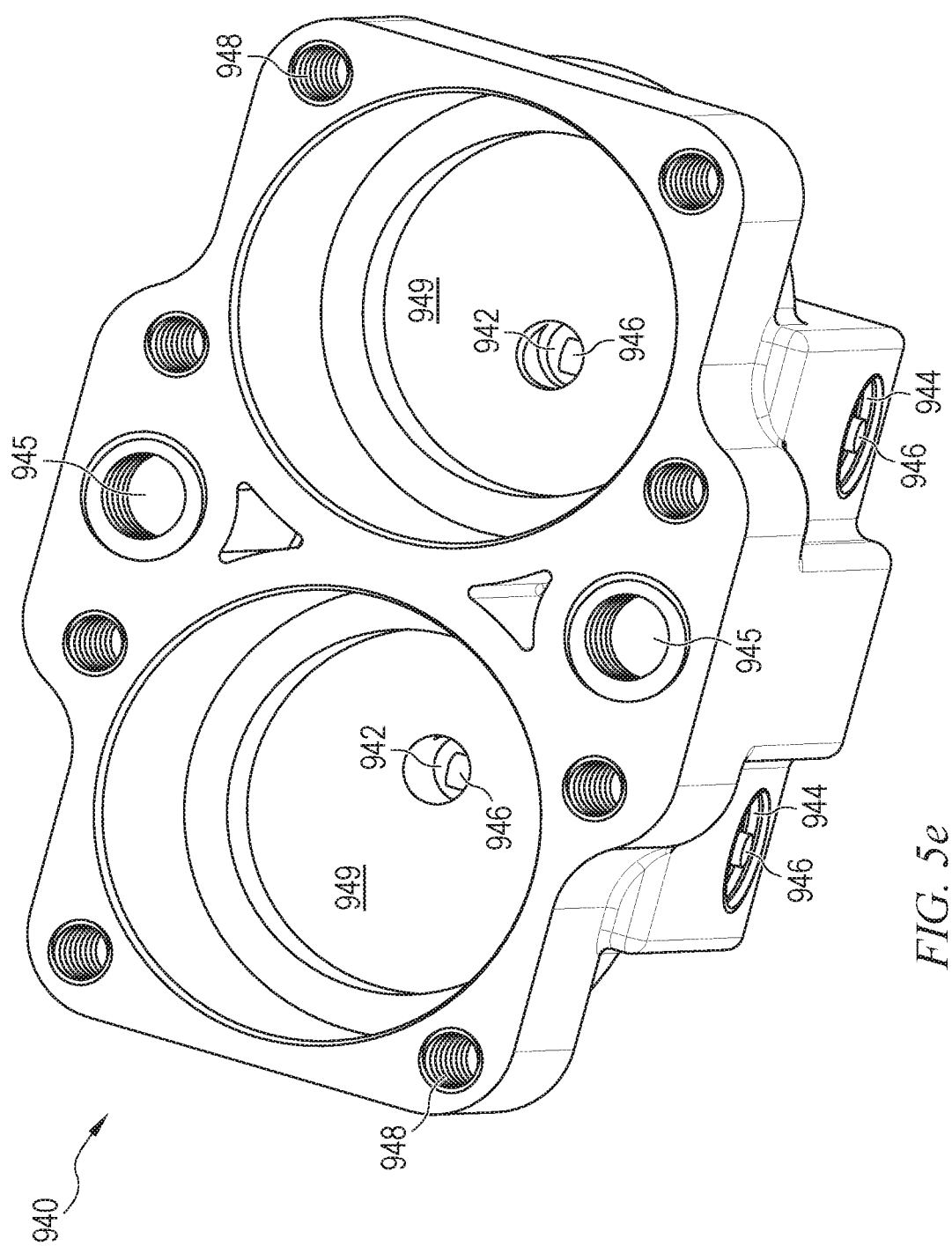

FIG. 5e illustrates manifold 940 from the side that cylinders 906 attach onto. The top end of each cylinder 906, opposite cap 950, is inserted into a corresponding cylinder opening 949. Each cylinder is hydraulically coupled to a hose 128 through an opening 942. Pathways 946 transmit hydraulic pressure from openings 942 to corresponding openings 944 so that transducers 903 are able to sense the magnitude of hydraulic pressure on both sides of the bypass system. Check valves or actuators 902 are inserted into openings 945 to control flow of hydraulic fluid between the two cylinders 906 inserted into cylinder openings 949.

Figure 5F:
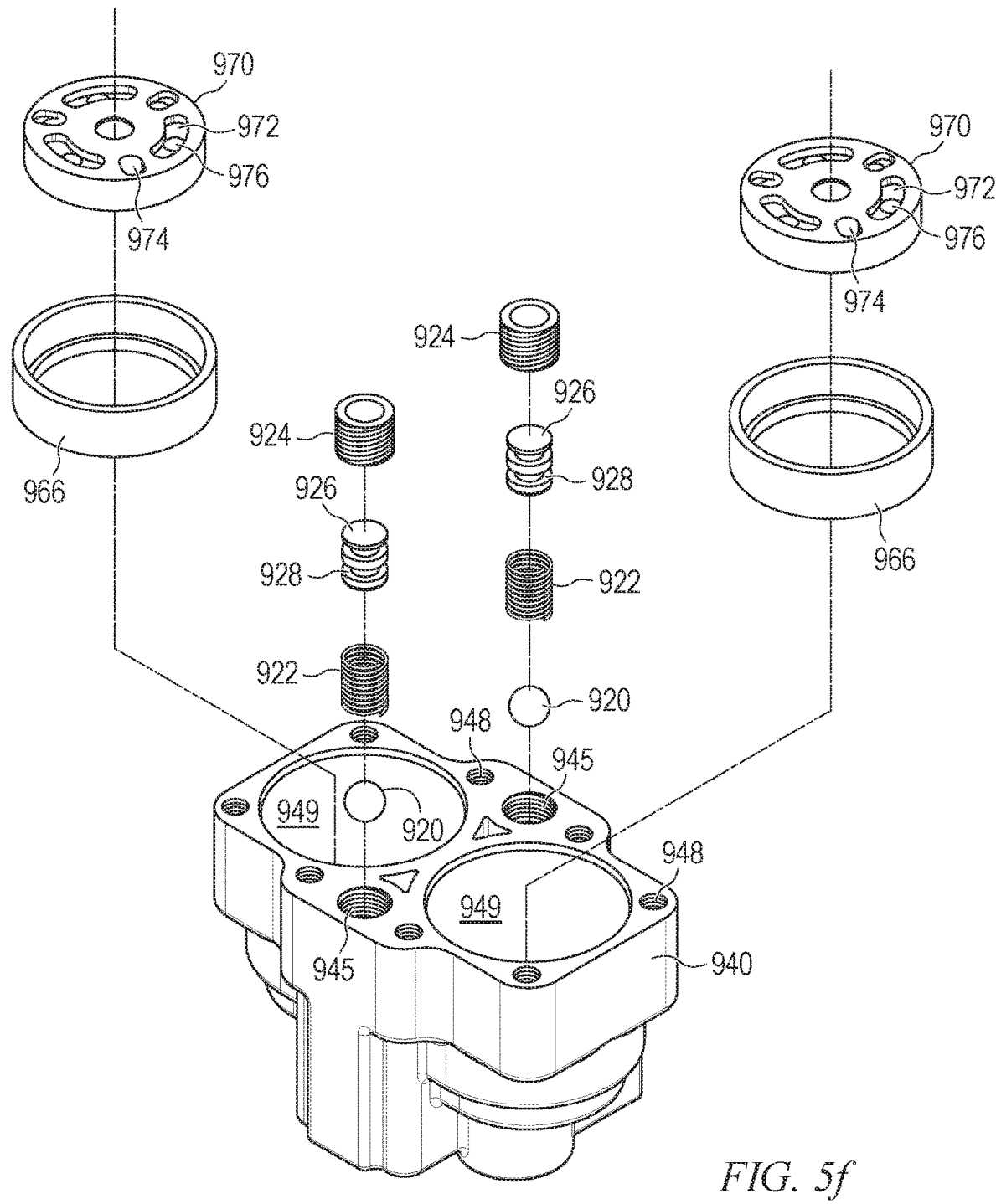

FIG. 5f illustrates an exploded view of the manifold assembly with check valves and hydraulic valves being inserted into manifold 940. Check valves 902 each include ball 920, spring 922, plunger 926, and base 924. Plunger 926 includes grooves 928 that accept O-rings to seal opening 945 when check valves 902 are installed. Bases 924 include threads to mechanically interface with threads in openings 945 and hold check valves 902 into the openings. Springs 922 extend between plungers 926 and balls 920 to press the balls against seats 918 within openings 945. Alternatively, in an active system, the motor, lead screw, and plunger assemblies 902C-902D are inserted into openings 945, having control terminals for the motor exposed to control the valves. A linear actuator or other actuation mechanism can be used in other embodiments.

Liners 966 are inserted into cylinder openings 949 to create a buffer between manifold 940 and shim stack dampening valves 970, reducing wear and tear. Liners 966 are formed from polytetrafluoroethylene (PTFE) or another polymer in some embodiments. Dampening valves 970 are illustrated as only the core of the valves. In use, a stack of shims will be bolted onto each side of the illustrated core. Each side of the core, i.e., the top and bottom faces as illustrated, includes tangentially oriented openings 972 and radially oriented openings 974. Each tangentially oriented opening 972 on one face of the core is coupled to a radially oriented opening 974 on the opposite face of the core through an opening 976.

The shims on one side of dampening valve 970 fully cover tangentially oriented openings 972 on that side of the valve, but the radially oriented openings 974 on that side extend outside a footprint of the shims. Hydraulic fluid flowing into or out of cylinders 906 flows through dampening valves 970, which regulate the flow rate of hydraulic fluid. When hydraulic pressure on a first side of dampening valve 970 is higher than a second side, the hydraulic pressure forces hydraulic fluid into the radially oriented openings 974 on the first side around the shims on that first side. The hydraulic fluid presses on and bends shims on the second side of the valve through tangentially oriented openings 972 on the second side that are covered by the shims.

Figure 5G:
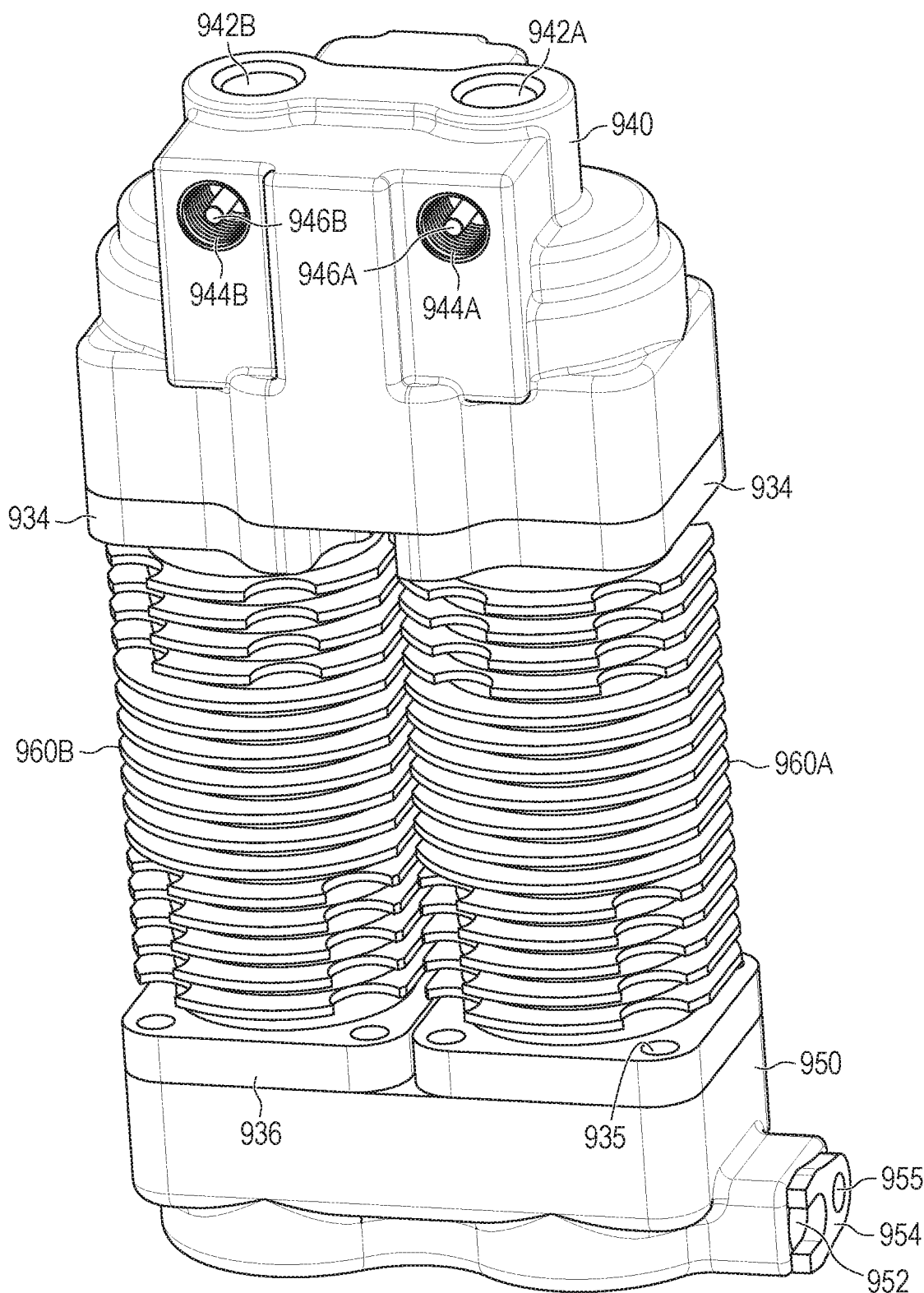

The characteristics of the shim stack on each side of dampening valve 970 determines how bypass system 900 behaves when presented with hydraulic pressure changes. Dampening valves 970 control the flow rate of hydraulic fluid into and out of cylinders 906. The rate of hydraulic fluid flowing to cylinders 906 from hydraulic system 120 during high-pressure events, or to hydraulic system 120 from cylinders 906 during low-pressure events, is limited by being forced through dampening valves 970. FIG. 5g illustrates manifold 940 put together with cylinders 906 and cap 950.

Figure 5H:
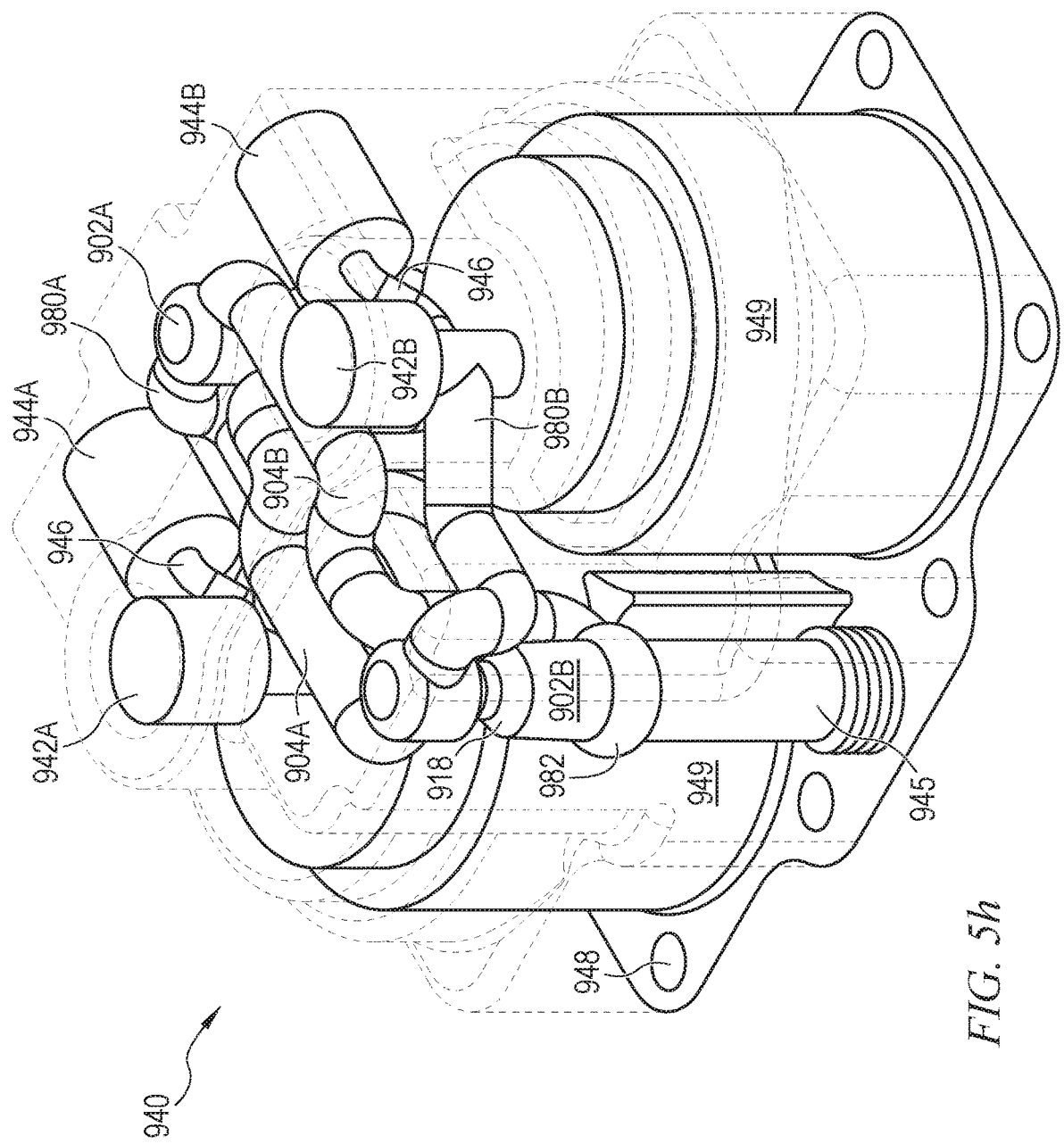

FIG. 5h illustrates a perspective view of manifold 940 with the material the manifold is formed of being illustrated in a transparent manner. The hydraulic pathways and other internal structures that the manifold 940 material forms are visible. Check valves 902 are installed into openings 945 with balls 920 against seats 918. A hydraulic pathway 980B extends from opening 942B to the upstream side of check valve 902B. Pathway 980A similarly extends from opening 942A to the upstream side of check valve 902A. Pathways 980 apply the hydraulic pressure of each side of bypass system 900 to the upstream side of a respective check valve 902. Pathway 904A extends from the upstream side of check valve 902B to the downstream side of check valve 902A. Pathway 904B extends from the upstream side of check valve 902A to the downstream side of check valve 902B.

When the hydraulic pressure at opening 942B is sufficiently greater than the hydraulic pressure at opening 942A, the pressure applied at the upstream side of check valve 902B will crack the check valve open. Hydraulic fluid flows through check valve 902B to pathway 904B at the downstream side of the check valve, and further through pathway 904B to the upstream side of check valve 902A. Finally, the hydraulic fluid flows through pathway 980A to the opening 942A side of bypass system 900. Hydraulic fluid flows from opening 942B through pathway 980B, check valve 902B, pathway 904B, and pathway 980A to opening 942A until the pressures on the sides of bypass system 900 equalize to the point that check valve 902B closes. Check valve 902A operates similarly when opening 942A includes a greater pressure than opening 942B, with hydraulic fluid flowing through pathway 980A, check valve 902A, pathway 904A, and pathway 980B in series to opening 942B.

Opening 945 includes an expanded portion 982 around check valves 902 where springs 922 are located. Hydraulic fluid flows between pathway 904B and check valve 902B within a height of spring 922. The expanded portion 982 allows hydraulic fluid to spread out and flow through the entire radius of the spring, increasing flow rate. While expanded portion 982 is not necessary, hydraulic fluid would then substantially flow through spring 922 only where opening 945 and pathway 904B meet, potentially limiting flow rate.

Figure 5I:
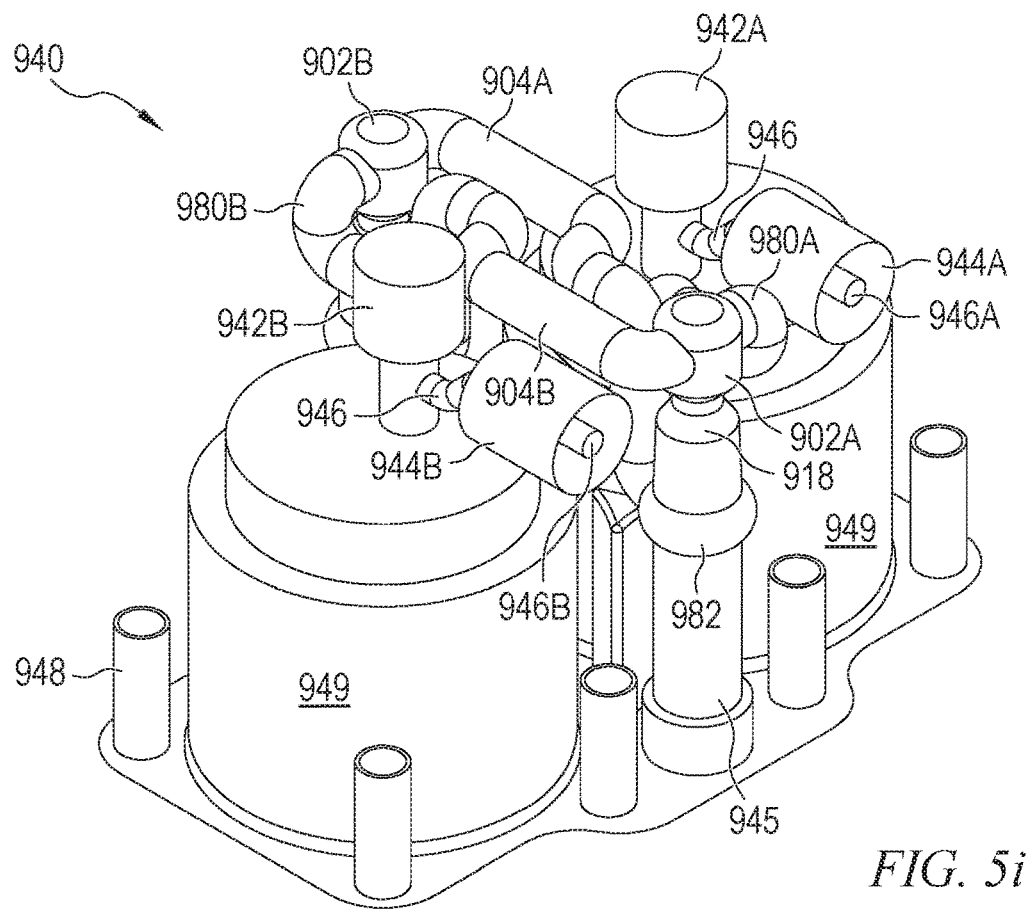
Figure 5J:
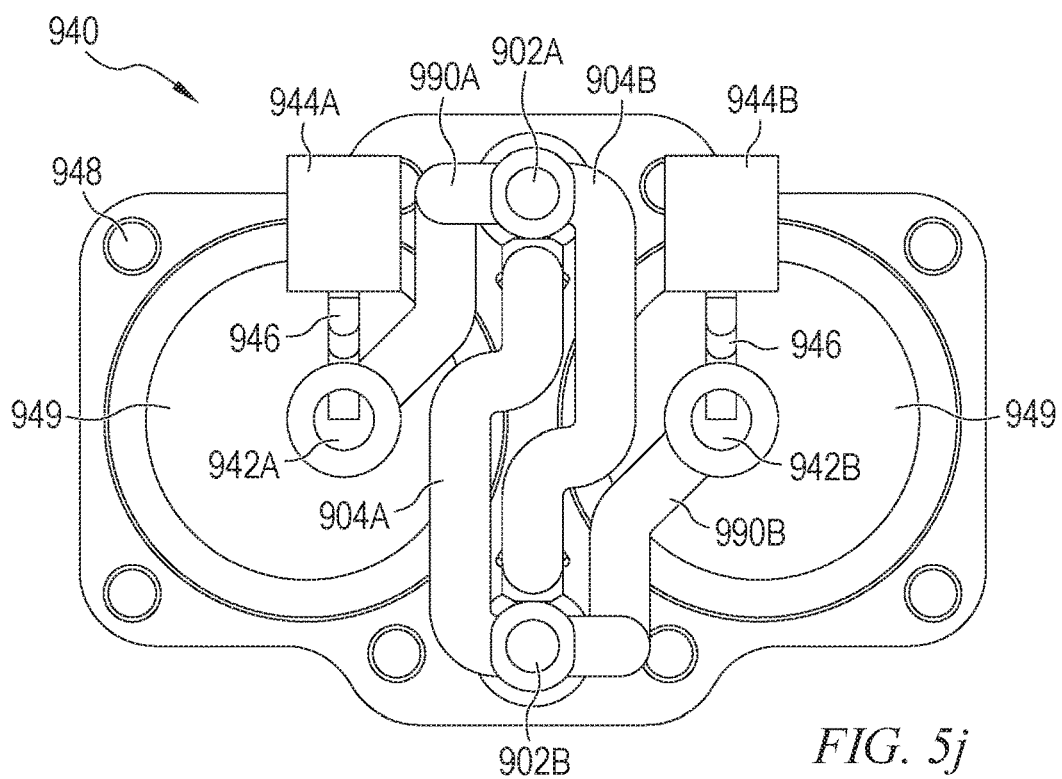

FIG. 5i illustrates an alternative perspective view to FIG. 5h, and FIG. 5j illustrates a top view. FIGS. 5h-5j show three different angles of the internal pathways of manifold 940.

Figure 6A:
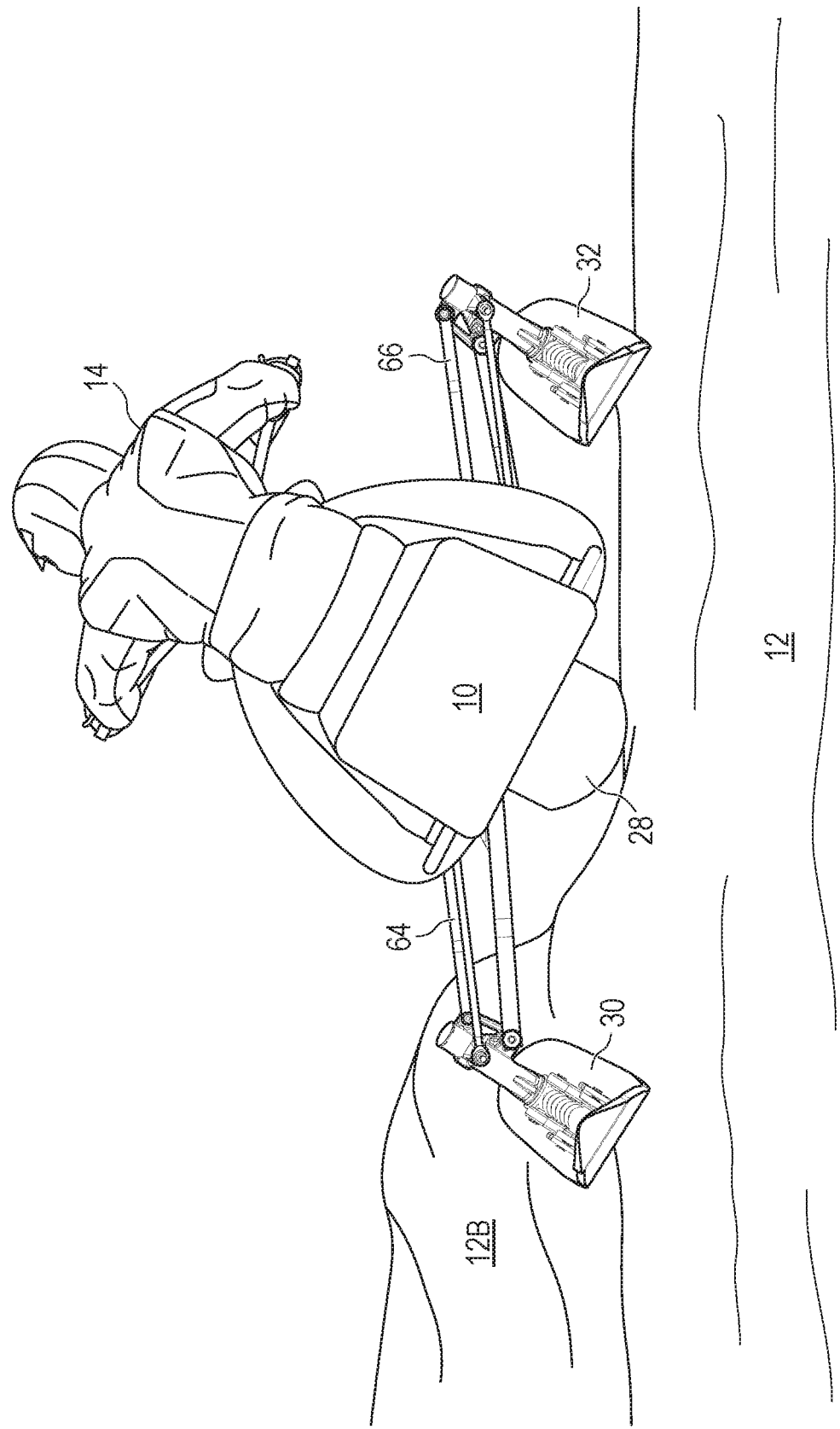
FIGS. 6a-6b illustrate situations benefiting from the functionality of the bypass system.
Figure 6B:
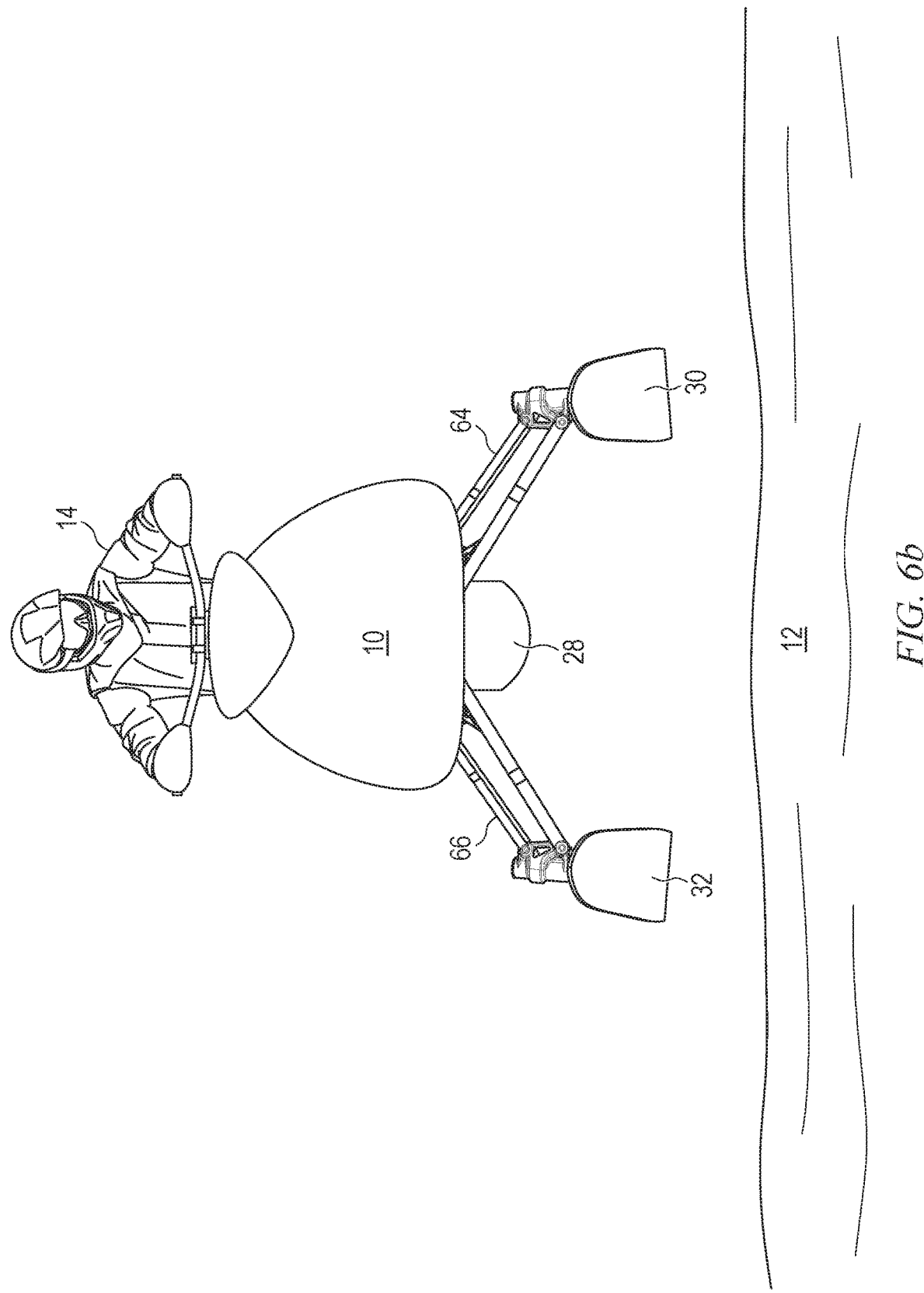

FIGS. 6a-6b illustrate situations where bypass system 900 provides significant benefit to a rider 14 of snowmobile 10 or other vehicle with leaning capability. In FIG. 6a, left ski 30 of snowmobile 10 is impacting a bump 12b in terrain 12. As ski 30 impacts bump 12b, a mechanical force is applied through ski 30 and suspension arm 64 to shock 68. Referring to FIG. 2b for the general structure of hydraulic system 120, the compressive force on shock 68 increases hydraulic pressure in hose 128A to hydraulic pump 262 and cylinder 906A of bypass system 900. The compressive force on shock 68 is absorbed by cylinder 906A accepting additional hydraulic fluid rather than solely by increased pressure to hydraulic pump 262, as would be the case without bypass system 900. Piston 908A moves lower, or more toward air canister 912, to accommodate additional hydraulic fluid volume. Air is forced into air canister 912 by piston 908A, which raises the air pressure in the air canister and under piston 908B.

If hydraulic pressure in hose 128A reaches the cracking pressure of check valve 902A, the compressive force on shock 68 is absorbed both by hydraulic fluid flowing into cylinder 906A, and also by hydraulic fluid flowing through the check valve to the shock 88 side of hydraulic system 120. Bypass system 900 reduces the maximum pressure on hydraulic pump 262, which reduces wear and improves operation of the pump.

FIG. 6b illustrates rider 14 taking snowmobile 10 over a jump. Gravity causes both suspension arms 64 and 66 to fall. An expansive force is applied to both shocks 68 and 88. The air pressure in shocks 68 and 88 under pistons 174 is significantly reduced. Without bypass system 900, the low pressure in both shocks 68 and 88 means that the shocks will not apply significant force back to terrain 12 when snowmobile 10 lands. Only once the shocks compress close to their resting positions do shocks 68 and 88 begin to significantly perform their intended task of cushioning the landing of snowmobile 10.

On the other hand, with bypass system 900, air canister 912 forces hydraulic fluid stored in cylinders 906 into shocks 68 and 88. The extra hydraulic fluid in shocks 68 and 88 increases the spring rate of the shocks during the jump while the shocks remain extended. Shocks 68 and 88 begin absorbing the shock of landing the jump quickly upon contacting terrain 12 because bypass system 900 approximately equalized the air pressure in the shocks with the air pressure in air canister 912. Once snowmobile 10 lands back on terrain 12, hydraulic fluid is returned from shocks 68 and 88 to cylinders 906 until the air pressure in air canister 912 returns to approximately the resting air pressure. Dampening valves 970 are used to regulate the rate at which hydraulic fluid flows between respective shocks 68 and 88 and cylinders 906.

Bypass system 900 allows hydraulic fluid to bypass hydraulic pump 262 by flowing through the bypass system instead of further increasing the hydraulic pressure seen at the hydraulic pump when the pressure of one side of hydraulic system 120 is above the hydraulic pressure in the other side by a desired maximum pressure. Limiting the pressure also increases performance of hydraulic pump 262 and helps control the temperature of the hydraulic fluid, reducing the likelihood of thermal breakdown of the fluid under elevated pressures.

Bypass system 900 provide the following capabilities. Adjustable high pressure bypass limit allows bypass system 900 to continually circulate hydraulic fluid of hydraulic system 120 to reduce oil temperature and set the maximum pressure seen at hydraulic pump 262. The pressure limit can be adjusted by replacing springs 922 with stiffer or weaker springs. In active systems, the pressure limit can be adjusted by modifying the algorithm used to control the bypass of fluid. Bypass system 900 controls the spring rate of suspension 34 by injecting additional fluid into, or removing fluid from, hydraulic shocks 68 and 88. Bypass system 900 provides rebound and compression damping. Bypass system 900 allows monitoring pressure across pump ports, across hydraulic shocks 68 and 88, or both.

As a passive system, bypass system 900 is activated when pressure drops below a set accumulator pressure (in air canister 912), thus maintaining the set pressure as suspension 34 extends. Oil flows from cylinders 906 into primary suspension hydraulic system 120 when the pressure in shocks 68 and 88 drops below the pressure in air canister 912. The pressure in hydraulic system 120 is thereby raised or maintained. Suspension 34 collapsing from full extension forces oil back into cylinders 906 through bypass valving to absorb suspension event energy.

As an active system, bypass system 900 is capable of adjusting spring rate and dampening throughout suspension travel by introducing or removing oil from hydraulic system 120 via electrically driven bypass reservoir pistons. Spring rate can be customized to different situations that a vehicle finds itself. The bypass ball check valves can be replaced with an electrically driven plunger capable of controlling bypass fluid flow via measurements from various sensors placed around the vehicle.

While one or more embodiments of the present invention have been illustrated in detail, the skilled artisan will appreciate that modifications and adaptations to those embodiments may be made without departing from the scope of the present invention as set forth in the following claims.

What is claimed is:

1. A hydraulic system, comprising:
    a hydraulic pump;
    a first hydraulic shock coupled to a first port of the hydraulic pump;
    a first floating piston disposed in the first hydraulic shock;
    a second hydraulic shock coupled to a second port of the hydraulic pump;
    a second floating piston disposed in the second hydraulic shock;
    a first hydraulic cylinder coupled to the first port of the hydraulic pump;
    a third floating piston disposed in the first hydraulic cylinder;
    a second hydraulic cylinder coupled to the second port of the hydraulic pump;
    a fourth floating piston disposed in the second hydraulic cylinder; and
    a first valve coupled between the first hydraulic cylinder and second hydraulic cylinder in parallel with the hydraulic pump.

2. The hydraulic system of claim 1, wherein the first valve is a ball and spring check valve.

3. The hydraulic system of claim 1, further including a second valve coupled between the first hydraulic cylinder and second hydraulic cylinder in parallel with the first valve, wherein the first valve and second valve are both unidirectional with a flow direction of the second valve opposite a flow direction of the first valve.

4. The hydraulic system of claim 1, further including an air canister coupled to the first hydraulic cylinder and second hydraulic cylinder opposite the hydraulic pump.

5. A hydraulic system, comprising:
    a hydraulic pump;
    a first hydraulic cylinder coupled to a first port of the hydraulic pump;
    a second hydraulic cylinder coupled to a second port of the hydraulic pump, wherein the hydraulic pump is configured to transfer hydraulic fluid from the first hydraulic cylinder to the second hydraulic cylinder when the hydraulic pump is operated in a first direction, and wherein the hydraulic pump is configured to transfer hydraulic fluid from the second hydraulic cylinder to the first hydraulic cylinder when the hydraulic pump is operated in a second direction opposite the first; and
    a first valve comprising an inlet coupled to the first port and an outlet coupled to the second port, wherein the valve is configured to allow hydraulic fluid to flow from the inlet to the outlet only when a first hydraulic pressure at the inlet relative to a second hydraulic pressure at the outlet exceeds a threshold.

6. The hydraulic system of claim 5, wherein the first valve is a ball and spring check valve.

7. The hydraulic system of claim 5, further including an air tank coupled to the first hydraulic cylinder and second hydraulic cylinder by an air pathway.

8. The hydraulic system of claim 5, further including a second valve coupled between the first hydraulic cylinder and second hydraulic cylinder, wherein a flow direction of the second valve is opposite a flow direction of the first valve.

9. A hydraulic system, comprising:
    a hydraulic pump including a first port and a second port;
    a first hydraulic cylinder directly hydraulically coupled to the first port;
    a second hydraulic cylinder directly hydraulically coupled to the second port; and
    a first check valve comprising an inlet directly hydraulically coupled to the first port and an outlet directly hydraulically coupled to the second port; and
    a second check valve comprising an inlet directly hydraulically coupled to the second port and an outlet directly hydraulically coupled to the first port.

10. The hydraulic system of claim 9, wherein the first check valve is a ball and spring check valve.

11. The hydraulic system of claim 9, further including an air canister coupled to the first hydraulic cylinder and second hydraulic cylinder opposite the hydraulic pump.

12. A method of bypassing fluid in a hydraulic system, comprising:
    providing a hydraulic pump including a first port and a second port;
    providing a first hydraulic cylinder directly hydraulically coupled to the first port;
    providing a second hydraulic cylinder directly hydraulically coupled to the second port;
    coupling a first check valve between the first port and second port with an inlet of the first check valve directly hydraulically coupled to the first port and an outlet of the first check valve directly hydraulically coupled to the second port; and
    coupling a second check valve between the first port and second port with an inlet of the second check valve directly hydraulically coupled to the second port and an outlet of the second check valve directly hydraulically coupled to the first port.

13. The method of claim 12, further including:
    providing a snowmobile including a suspension comprising a first shock and a second shock;
    coupling the first port of the hydraulic pump to the first shock; and
    coupling the second port of the hydraulic pump to the second shock.

14. The method of claim 13, further including using the hydraulic pump to actuate the first shock and second shock, thereby leaning the snowmobile.

15. The method of claim 12, further including attaching an air canister to the first hydraulic cylinder and second hydraulic cylinder opposite the hydraulic pump.

* * * * *